(12) United States Patent
Goei

(10) Patent No.: US 12,151,582 B2
(45) Date of Patent: *Nov. 26, 2024

(54) MOBILE ELECTRIC VEHICLE CHARGING STATION SYSTEM

(71) Applicant: Power Hero Corp., La Verne, CA (US)

(72) Inventor: Esmond Goei, Blaine, WA (US)

(73) Assignee: Power Hero Corp., La Verne, CA (US)

( * ) Notice: Subject to any disclaimer, the term of this patent is extended or adjusted under 35 U.S.C. 154(b) by 194 days.

This patent is subject to a terminal disclaimer.

(21) Appl. No.: 17/857,840

(22) Filed: Jul. 5, 2022

(65) Prior Publication Data

US 2022/0332210 A1 Oct. 20, 2022

Related U.S. Application Data

(63) Continuation of application No. 16/412,118, filed on May 14, 2019, now Pat. No. 11,413,982.

(Continued)

(51) Int. Cl.
| | | |
|---|---|---|
| *H02J 7/00* | (2006.01) |
| *B60L 53/53* | (2019.01) |
| *B60L 53/66* | (2019.01) |
| *B60L 53/67* | (2019.01) |
| *B60L 53/68* | (2019.01) |
| *G05B 13/02* | (2006.01) |
| *G06Q 10/1093* | (2023.01) |

(Continued)

(52) U.S. Cl.
CPC ............. *B60L 53/67* (2019.02); *B60L 53/53* (2019.02); *B60L 53/665* (2019.02); *B60L 53/68* (2019.02); *G05B 13/0265* (2013.01); *G06Q 10/1095* (2013.01); *G08G 1/202* (2013.01); *H04L 67/12* (2013.01)

(58) Field of Classification Search
CPC .......... B60L 53/67; B60L 53/68; B60L 53/53; B60L 53/665; G06Q 10/1095; H04L 67/12
USPC ........................................................ 320/109
See application file for complete search history.

(56) References Cited

U.S. PATENT DOCUMENTS

| | | | |
|---|---|---|---|
| 9,390,062 B1 * | 7/2016 | Ashton | B60L 50/10 |
| 9,887,570 B2 * | 2/2018 | Johnsen | B60L 53/14 |

(Continued)

FOREIGN PATENT DOCUMENTS

WO 2011107289 A1 9/2011

OTHER PUBLICATIONS

Canadian Intellectual Property Office: Examination Report of CA 3100361 (related application); Phoenix Bard-Cavers; Nov. 9, 2023; 3 pages.

(Continued)

*Primary Examiner* — Alexis B Pacheco

(57) ABSTRACT

A mobile charging platform for charging an electric vehicle includes an electric vehicle charger for charging the electric vehicle. A connector connects the electric vehicle to the electric vehicle charger. A power source provides power to the electric vehicle charger. A mobile charging platform controller determines a first position of the mobile charging plat form and transmits and receives control data for scheduling a meeting location between the mobile charging platform and the electric vehicle responsive to the first position of the mobile charging platform and a second position of the electric vehicle.

20 Claims, 16 Drawing Sheets

Related U.S. Application Data

(60) Provisional application No. 62/671,526, filed on May 15, 2018.

(51) Int. Cl.
  *G08G 1/00* (2006.01)
  *H02J 7/14* (2006.01)
  *H04L 67/12* (2022.01)

(56) References Cited

U.S. PATENT DOCUMENTS

| | | | |
|---|---|---|---|
| 9,987,940 B2 | 6/2018 | Uyeki | |
| 10,042,359 B1 | 8/2018 | Konrardy et al. | |
| 10,857,902 B2 | 12/2020 | Goei et al. | |
| 2008/0278264 A1 | 11/2008 | Karalis et al. | |
| 2009/0066287 A1 | 3/2009 | Pollack et al. | |
| 2010/0225271 A1 | 9/2010 | Oyobe et al. | |
| 2011/0025267 A1* | 2/2011 | Kamen | B60L 53/665 320/109 |
| 2012/0262002 A1 | 10/2012 | Widmer et al. | |
| 2012/0271758 A1* | 10/2012 | Jammer | G07F 15/003 701/22 |
| 2012/0303259 A1* | 11/2012 | Prosser | B60L 53/57 701/400 |
| 2013/0181672 A1 | 7/2013 | Egoshi | |
| 2014/0021908 A1 | 1/2014 | McCool et al. | |
| 2015/0095789 A1 | 4/2015 | Hyde et al. | |
| 2015/0155715 A1 | 6/2015 | Kobayashi | |
| 2015/0160029 A1 | 6/2015 | Kobayashi | |
| 2016/0236583 A1 | 8/2016 | Kamen et al. | |
| 2016/0368464 A1* | 12/2016 | Hassounah | B60L 53/80 |
| 2017/0140349 A1* | 5/2017 | Ricci | B60L 53/63 |
| 2017/0250550 A1 | 8/2017 | Miftakhov et al. | |
| 2017/0267214 A1 | 9/2017 | Penilla et al. | |
| 2017/0282736 A1 | 10/2017 | Goei | |
| 2017/0358041 A1 | 12/2017 | Forbes, Jr. et al. | |
| 2018/0062420 A1 | 3/2018 | Isaac | |
| 2018/0361870 A1 | 12/2018 | Zhao et al. | |
| 2019/0118655 A1 | 4/2019 | Grimes et al. | |
| 2019/0255963 A1 | 8/2019 | Goei | |
| 2019/0351783 A1 | 11/2019 | Goei | |
| 2020/0262305 A1* | 8/2020 | Chakraborty | B60L 53/57 |
| 2021/0129695 A1* | 5/2021 | De Blasio | B60L 53/62 |

OTHER PUBLICATIONS

PCT: International Preliminary Report on Patentability of PCT/US2019/032447 (related application); Agnes Wittmann-Regis; Nov. 17, 2020; 9 pages.

PCT: International Search Report and Written Opinion of PCT/US2019/032447 (related application); Aug. 15, 2019; 10 pages.

Canadian Intellectual Property Office: Examination Report of CA 3100361 (related application); Phoenix Bard-Cavers; Jan. 30, 2023; 5 pages.

* cited by examiner

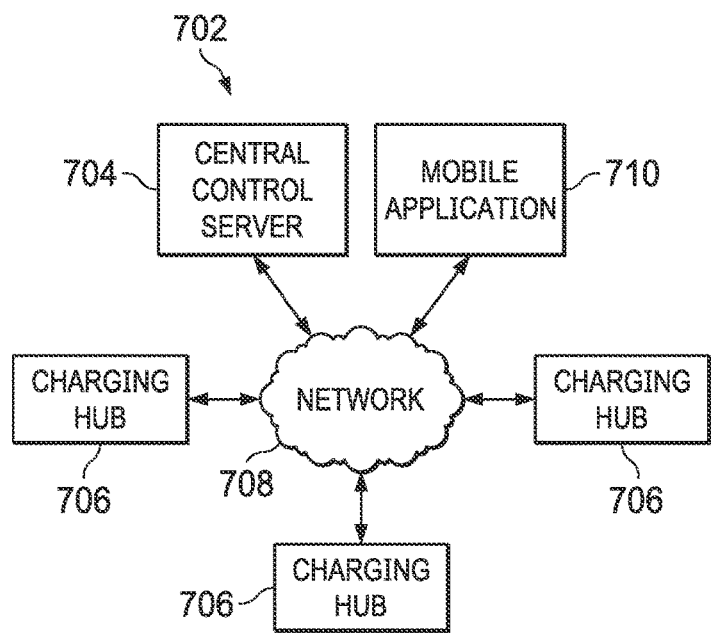
FIG. 7
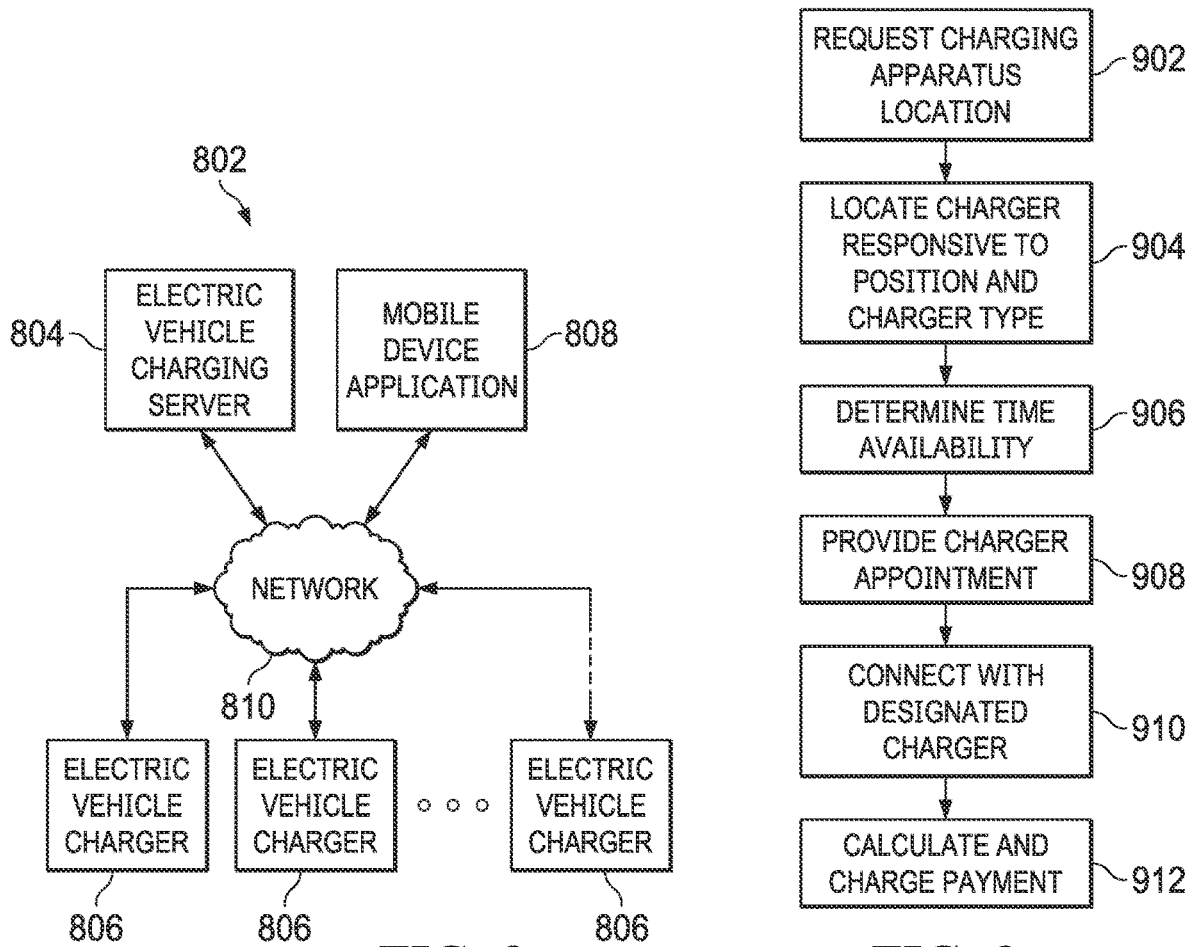
FIG. 8
FIG. 9

MOBILE ELECTRIC VEHICLE CHARGING STATION SYSTEM

CROSS-REFERENCE TO RELATED APPLICATIONS

This application is a Continuation of U.S. application Ser. No. 16/412,118, filed May 14, 2019, entitled MOBILE ELECTRIC VEHICLE CHARGING STATION SYSTEM, which claims the benefit of U.S. Provisional Application No. 62/671,526, filed on May 15, 2018, entitled MOBILE ELECTRIC VEHICLE CHARGING STATIONS, which is incorporated by reference in its entirety.

TECHNICAL FIELD

The system is related to charging systems for electric vehicles, and more particularly, to a system for providing a mobile electric vehicle charging system for providing charging services to vehicles in transit.

BACKGROUND

Although electric vehicles ("EV(s)") are becoming more popular, the lack of availability and access to public charging stations for the charging of EVs remains one of the top hindrances to widespread EV adoption. The high cost of construction and charging equipment ("Charger(s)") hinders the deployment of public EV charging stations ("EV Station (s)"), particularly the Level-3 Direct Current Fast Charger(s) ("DCFC") which are the most capital-intensive. Given the high cost of construction of these EV Stations which requires utility company intervention and structural modification of the location designated for the placement of Chargers it is uneconomical to simply provision an EV Station with a single Charger. Thus an EV Station tends to have at least two or more Chargers per EV Station. As such the current state of Charger deployment as of the time of writing is about 17,000 EV Stations, hardly comparable in geographical distribution and density to the number of gasoline stations which number around 170,000 today. Thus, an EV driver or drivers ("Driver(s)") usually have to take a lengthy detour from the intended travelling route just to charge at such public EV Stations before resuming their journey.

SUMMARY

The present invention, as disclosed and described herein, in one aspect thereof comprises a mobile charging platform for charging an electric vehicle includes an electric vehicle charger for charging the electric vehicle. A connector connects the electric vehicle to the electric vehicle charger. A power source provides power to the electric vehicle charger. A mobile charging platform controller determines a first position of the mobile charging plat form and transmits and receives control data for scheduling a meeting location between the mobile charging platform and the electric vehicle responsive to the first position of the mobile charging platform and a second position of the electric vehicle.

BRIEF DESCRIPTION OF THE DRAWINGS

For a more complete understanding, reference is now made to the following description taken in conjunction with the accompanying Drawings in which:

FIG. 7 illustrates a generic system for managing and reserving charging stations;

FIG. 8 illustrates an electric vehicle charging management system;

FIG. 9 is a flow diagram illustrating a process for using the electric vehicle charging management system;

DETAILED DESCRIPTION

Figure 1:
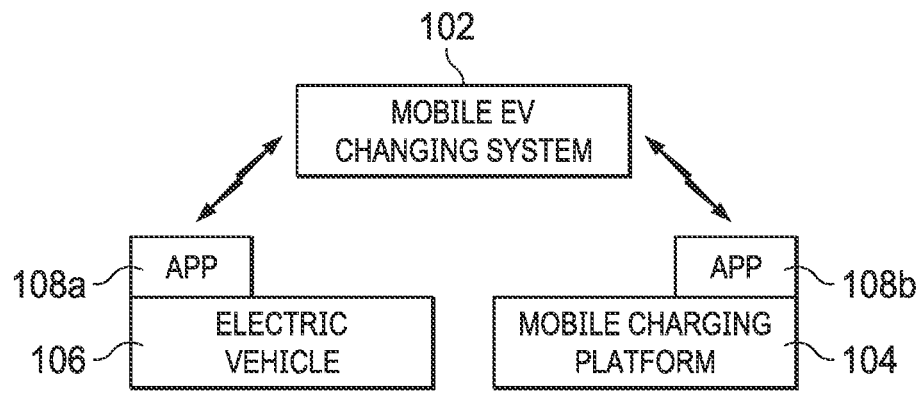
FIG. 1 illustrates a block diagram of the interactions of a mobile electric vehicle charging system.

Referring now to the drawings, wherein like reference numbers are used herein to designate like elements throughout, the various views and embodiments of mobile electric vehicle charging station system are illustrated and described, and other possible embodiments are described. The figures are not necessarily drawn to scale, and in some instances the drawings have been exaggerated and/or simplified in places for illustrative purposes only. One of ordinary skill in the art will appreciate the many possible applications and variations based on the following examples of possible embodiments.

Referring now to FIG. 1, the system described herein is a mobile EV charging system 102 ("MEC") for the reservation of, and the deployment and use of chargers that are incorporated into a mobile charging platform 104 such as a truck or van, or a container module that can be transported, and which can then be dispatched on an "as-needed" basis to meet a requesting driver of an electric vehicle 106 ("EV") at a pre-arranged location for a charging session. Communications between the MEC 102, the mobile charging platform 104 and the EV 106 are accomplished using applications 108 that are associated with each of the mobile charging platform 104 and EV 106. Extending the concept, the system uses vehicles for the mobile charging platform 104 that can carry the EV 106 on board to charge it while travelling on the road towards the EV's intended post-charging destination. For example, such carrier vehicles may take the form of flatbed equipped trucks to carry/transport and simultaneously charge the EV 106 that is requiring the charge. The truck could continue to travel the original route of the requesting driver while the EV 106 is being charged such that the overall trip travel time is not compromised for the sake of charging the EV. Another type of carrier might be an enclosed trailer that is hauled by a "tractor" as is typical for an "18-wheeler" tractor-trailer that is used for the transportation of goods and equipment.

The MEC 102 embodies the use of economy sharing or crowdsourcing techniques to utilize existing resources already available in the general economy (the "crowd") to provide various assets and services such as independently owned flatbed trucks, tow-trucks, tractor-trailers, mobile food truck operators, charging outlets and stations that may or may not be supplemented with IoT (Internet-of-Things) control devices for automated reservation, etc. MEC 102 also uses technology and techniques commonly employed in Cloud applications such as redundancy and self-healing networks for reliability, databases, IoT, use of Internet, WiFi, 3G, 4G, 5G, etc. data networks, radio and satellite communications, artificial intelligence, etc.

Note that while the present descriptions describes charging of the batteries onboard an EV 106, the concept is applicable for the replenishment of other depleted energy storage devices such as hydrogen-fueled vehicles, or the charging of other electrical and non-electrical apparatuses. For simplification of the discussion the invention described herein will explicitly describe the use of the invention as it is applied to charging EVs 106.

Figure 3:
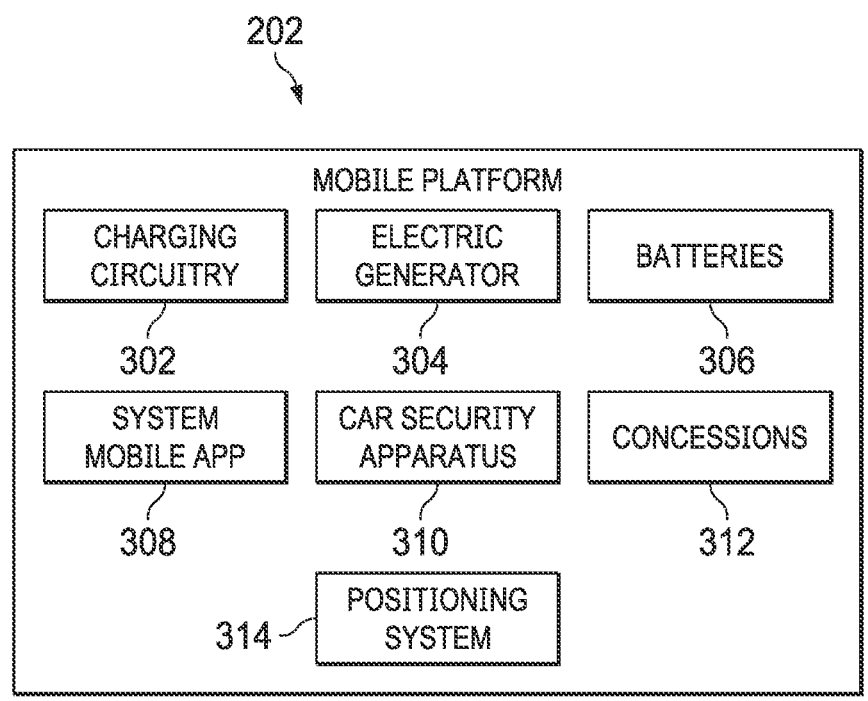
FIG. 3 illustrates a block diagram of a mobile charging platform.
Figure 2:
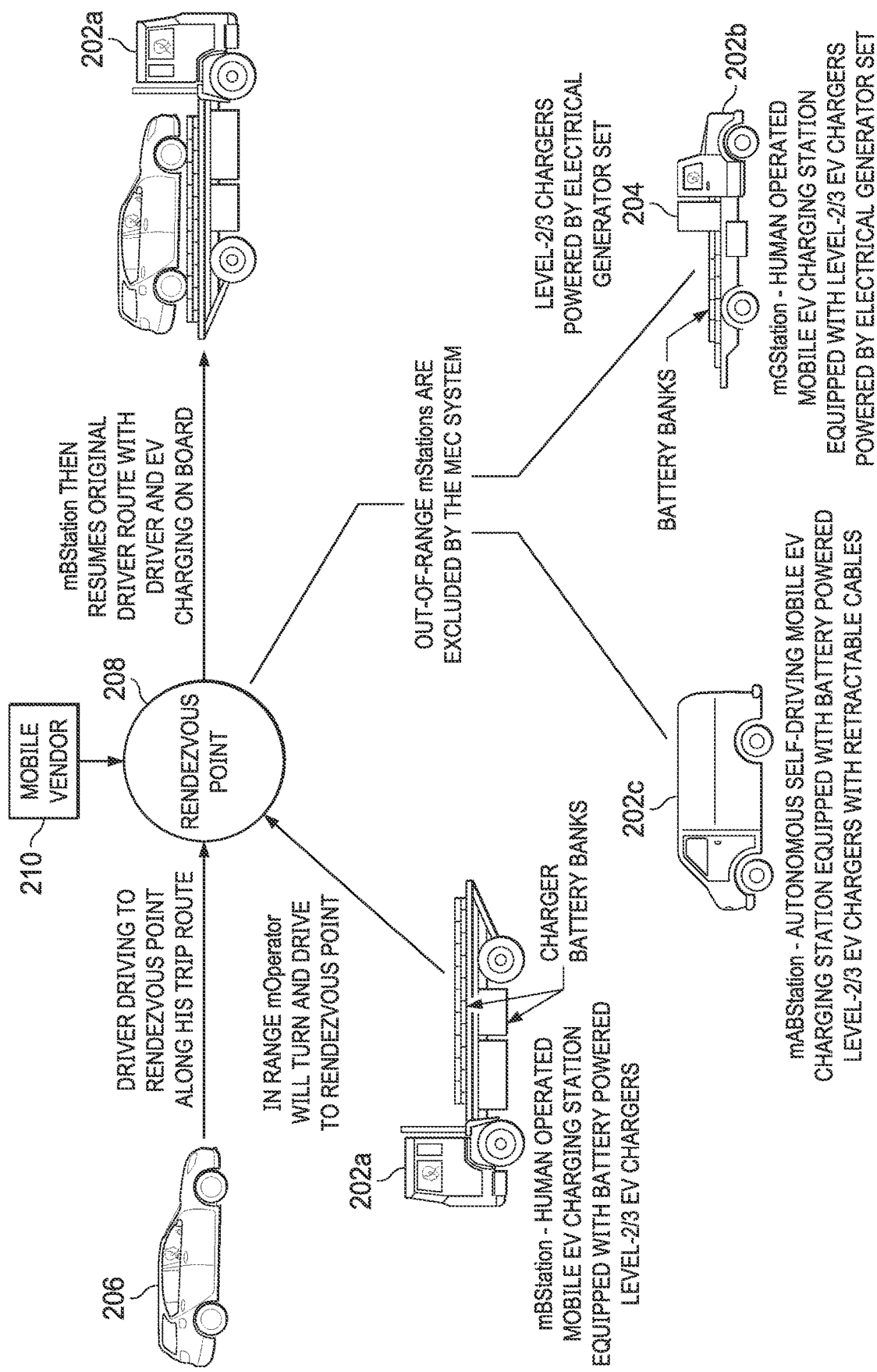
FIG. 2 illustrates a mobile electric vehicle station charging scenario.

Referring now to FIG. 2, there is illustrated the general scenario for implementation of a mobile EV charging station 102 and FIG. 3 illustrating a block diagram of a mobile EV charging station 202. Mobile stations ("mStation(s)") 202 consist of vehicles or transportable platforms/containers that are equipped with chargers 302 powered by electricity generators 304 that run on gasoline, diesel fuel or another motor powered source, or banks of batteries 306 capable of supplying continuous direct current that may be used as is, or converted to various DC voltages, or converted into AC power. In this discussion, an mStation 202 that is equipped with battery banks 306 as the EV charger 302 power source is designated as an "mBStation." If the mobile platform of the mBStation is an autonomous vehicle, the mStation 202 is designated as an "mABStation", and if the charger 302 is powered by an electrical generator 304, the mStation is designated as a "mGStation". The mStation 202 further includes a system mobile application 308 for providing communications and control from the mobile EV charging system 102 through a wireless communications interface. The mStation 202 further includes a vehicle securing apparatus 310 for securing a vehicle onto the mobile charging platform so that the vehicle can continue to be transported toward their destination while the vehicle is being charged. The vehicle securing apparatus 310 may comprise clamps, chains, etc. for securing the vehicle in a fashion that prevents its movement during transport. Although the invention is applicable to various scenarios of equipment charging modalities such as the charging of computers or providing localized micro grid power for special events such as fairs or conventions, for convenience this invention is described in the scenario of mobile charging stations for charging EVs. Further, unless specified otherwise, the reference to mStation 202 will presume to apply to both an mBStation and an mGStation.

In such an mobile EV charging system 102 it is envisaged that the mobile carrier 202 for the charger 302 could be a van, truck or other suitable vehicle or container. One particular useful embodiment would be the use of a flatbed truck as is customarily used in emergency road service operations for the transportation of vehicles that may have stalled on the roadway, is inoperable due to a depleted battery, and/or have run out of fuel, and in the case of EVs 206, one that has a low battery charge. In such a scenario of a flatbed truck as the carrier for an mStation 202, the EV 206 that is in need of a charge can be placed onto the flatbed of the truck and connected to an onboard charger 302 so that the EV 206 could be charged while it is being transported by the flatbed truck along the original route plotted for the EV, thus eliminating any dead time just for charging the EV. As an added benefit, the mStation 202 may be equipped with certain amenities such as hot and cold drinks or other concessions 312, and/or the mStation driver/operator ("mOperator") may be commissioned to pick up such refreshments at appropriate vendors ("Vendor(s)") prior to the rendezvous at the rendezvous point 208, or a mobile vendor (mVendor") 210 may be included at the rendezvous point 208. Thus, a driver would have refreshments during the time that his EV 206 is charging on the mStation 202. In addition the rendezvous point 208 could have been set at places of rest along the trip route, which has amenities such as restrooms and refreshments. In the extreme, large carriers such as tractor-trailers could be provisioned and configured as meeting/rest facilities on wheels, which would be equipped with all the trappings of a motel or guest house. Also, while it is not shown, the carrier could be a tow truck that pulls the EV 206 along while the driver sits in the cab of the tow truck as it continues on the driver's trip, while charging. It is envisaged that such charging services would garner fees for the service as to make the provision of mStations 202 a profitable service. Alternatively, an mOperator may simply rendezvous with the reserving driver along the driver's planned route at optimal times and locations as to minimize the time loss for recharging by the need to detour a long distance to a stationary charging station. In the latter case where a driver simply requests a charge at a rendezvous point 208, a van-equipped charging equipment, or other cost-effective mobile mStation configuration may more economically be used for such temporary stationary rendezvous.

The charger 302 for the EV mStation 202 will likely be provisioned with a Level-2 or Level-3 charger. Battery bank(s) 306 may supply power for the charger or an engine powered electrical generator(s) 304. If the driver desires to minimize his stationary time while charging he would best be served by a flatbed, tow-truck, or tractor-trailer mStation 202 so that he can continue on his journey while in the process of getting his EV 206 charged. In such a case the mStation 202 would be equipped with either a Level-2 or Level-3 Charger 302 depending on the needs of the requesting EV driver. A Level-2 charger 302 would take at least an hour to provide sufficient charge for the EV 206 to travel between 25 to 50 miles for an hour's charge. A Level-3 DCFC fast charger may only require 15 minutes of charging time to provide the equivalent amount of charge as a Level-2 charger taking 2 hours. All these options will be automatically assessed and initiated by MEC 102 and matched to the requesting driver's criteria and the appropriate mStation 202 will be dispatched at the appropriate time to rendezvous with the driver.

The mStations 202 are continuously tracked and their itineraries are refreshed continuously as submitted by the mOperator. When a driver submits a routing plan via a driver mobile app ("dApp") 108a that is connected to MEC 102 via an Internet cloud (the "Cloud") or other wireless communications network/environment, the MEC matches up and tags several mStations 202a whose operating areas coincide with the driver's planned travel route and times ("Trip Plan") as submitted by the driver. Any mStation 202b that is not within a defined range will be excluded from bidding to accept the requested reservation. Such exclusions may also result from mOperators having already booked other rendezvous at other times that may overlap with the current request. Various protocols may be set by the administrator of MEC 102 (the "Administrator") which governs the reservation and fulfillment process, taking into account instances of "no-shows" where either the driver and/or the mOperator 202 fails to show up for the rendezvous. Such protocols are at the discretion of the Administrator. In addition, the artificial intelligence ("AI") in MEC 102 could be assigned the responsibility for resolving such issues as will be more fully described herein below.

MEC 102 operates round the clock, 7 days a week and 24 hours a day (24×7) and continuously monitors the locations of the mOperators that have set their status as being available ('on-call'). Such status may be set via the mOperator's smart device app ("mApp") 108b which is connected via the cloud and matched to candidate mOperators that could intercept and meet the driver at pre-arranged rendezvous point 208. Bookings and confirmations between the mOperators and the driver may be made either by manual interaction between the mOperator and the driver through their respective apps 108, within pre-defined parameters that ensures that the tagged parties are able to make the scheduled rendezvous. As both parties are likely moving. i.e. mobile, the MEC 102 is continuously or regularly assessing the time window within which the rendezvous is possible, and should either party (the driver or selected mOperator) move out of the time window, the MEC 102 will alert the errant party and provide instructions to come back into compliance with the time window or risk having the rendezvous reservation cancelled, with attendant penalties and protocols as may be instituted by the MEC Administrator.

As the intention for implementing MEC 102 is to provide charging service to drivers, it is likely that the MEC would be set to allow the driver greater flexibility on adhering to the time window and puts the onus on the mOperator to adjust his movements to conform to the needs of the driver. Thus, when a driver decides to make an unscheduled stop, the MEC 102 is able to adjust the parameters of the rendezvous and even re-allocate the reservation to a different mOperator should the driver's travel actions change the dynamics of the pending reservation; all of which are subject to monetary penalties that may be imposed by the MEC, as set by the administrator. These adjustments to the reservation dynamics will be made by the MEC 102 continuously or regularly once a driver's reservation request is confirmed and his location is continuously monitored. Simultaneously, the MEC 102 will monitor the location of the mOperator that has been tagged to fulfill the rendezvous reservation.

The MEC 102 could sync up the location finders on both the mOperator's location finder system or global positioning system ("GPS") 314 in this example, with the requesting driver's GPS location and regularly updates both systems and inform the respective parties of the estimated time of arrival ("ETA") of each other to the scheduled rendezvous location. The mobile apps 108 of each party will show the real-time locations of each other and the projected destination and arrival times of each party. Any disconnects or differences between the two parties' projected destination locations will cause an alarm and triggers an intervention protocol with specific instructions and actions, such as messaging between the two parties and/or parties' GPS systems in order to correct the rendezvous destination points 208 so as to coincide into one single location. The administrator can set parameters governing the rendezvous such as the allowable time for deviation from the reserved rendezvous time, the type of responding mOperator (eg. flatbed truck, or enclosed container, type of charging equipment, etc.). Again, the MEC 102 or the administrator has the ability to undertake necessary protocols in handling such deviations, as may be agreed to by contract with a reserving MEC member driver.

Figure 4:
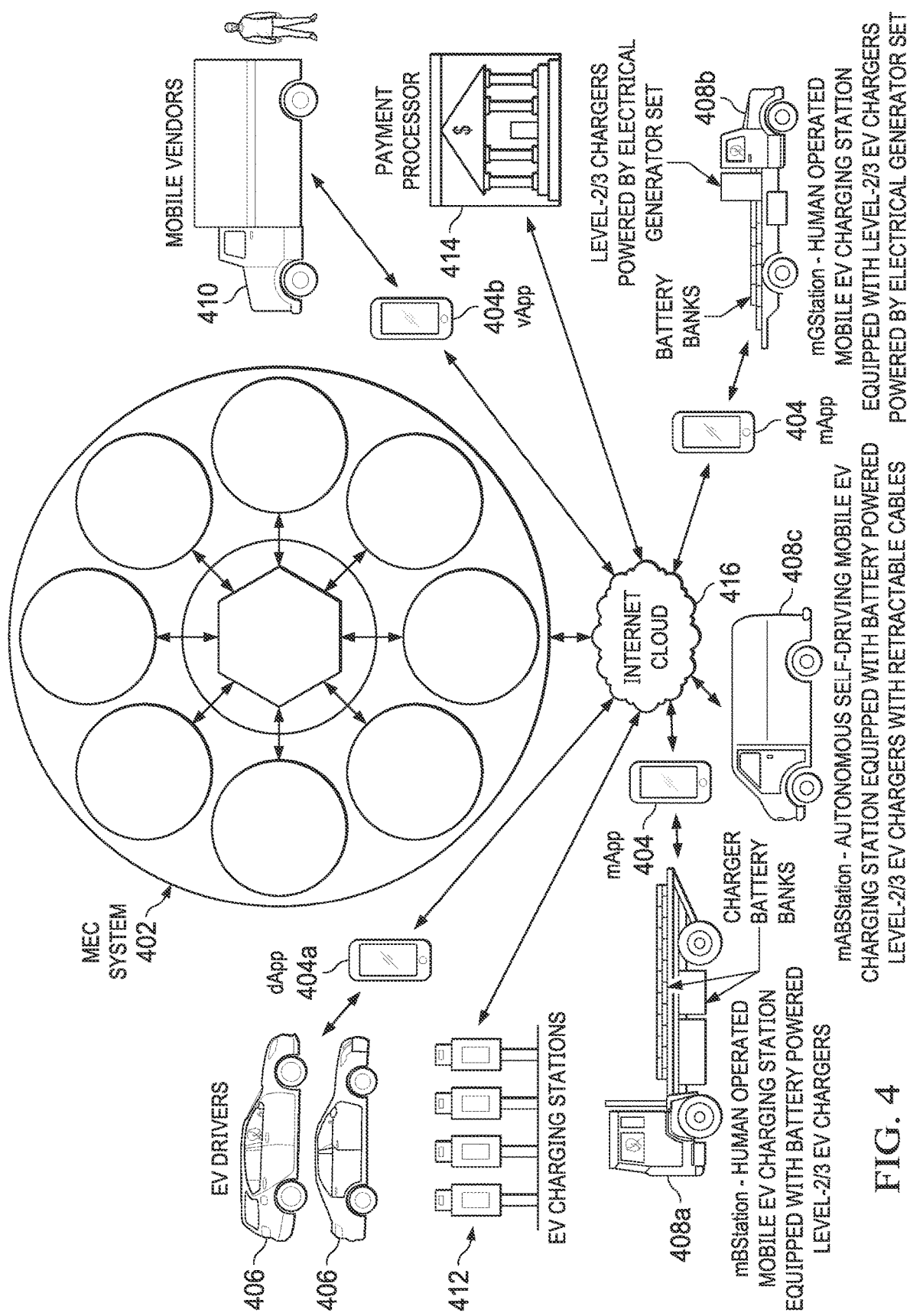
FIG. 4 illustrates a mobile electric vehicle charging network overview.

As depicted in FIG. 4, the MEC network comprises the controlling MEC system 402, various apps 404 that are operated by different types of users ranging from drivers 406, mStations 408 operated by mOperators, vendors, mVendors 410, fixed EV Charging Stations 412, the MEC Administrator (not shown) and a payment processor ("Processor") 414. A driver 406 initiates a request for a charge reservation session via his dApp 404a which is connected to the MEC 402 via the cloud 416 ranging from a one-time charge near his current location to a series of charges at different locations according to a Trip Plan. The request is processed by the MEC 402, which manages the resources and parties associated with the driver's request. Such request may require a simple look-up by the MEC 402 of available fixed EV charging stations 412 near his location to a complicated Trip Plan which involves making rendezvous along the route with several mOperators with varying equipment, and possibly arranging rendezvous with mobile vendors 410 supplying food and drinks, and processing payments via a payment processor 414.

The mStations 408a, 408b may take the form of tow trucks, vans, flatbed truck, tractor-trailer, etc that are equipped with chargers 302 connected to battery banks 306, and/or powered electrical generators 304 such as those that are powered by diesel fuel, or even hydrogen as described above. It is expected that such carriers would be provisioned with either Level-2 or Level-3 chargers as Level-1 chargers would take too long to charge an EV 406 at a temporary rendezvous. However, an autonomous mBStation "mABStation" 408c may be provisioned with a bank of Level-1 outlets for use as a transportable stationary EV station where prolonged charging may be feasible such as parking lots for employees, trade fairs, etc. All Level-1, Level-2 and/or Level-3 chargers and associated equipment and accessories are compliant with current governing standards of design and use, and as standards evolve and are adopted this invention assumes compliance with all necessary standards and governing bodies.

In the case of an mStation 408a that is equipped with battery banks connected to chargers 302, the charger battery bank(s) 306 may be replenished either continuously or occasionally via plugging into the grid, or by trickle charging via an on-board solar cell array(s), a wind generator, or even a small powered electrical generator. In other words, an mStation's charger battery bank(s) 306 must be recharged whenever it is discharged in charging an EV 406, and this invention contemplates some mechanism for recharging the onboard charger battery bank(s).

In the event that an mStation carries multiple chargers 302, charge controllers will be used to manage the distribution of electricity drawn by multiple EVs 406 from the multiple chargers. This invention also contemplates the need for mStations 408 to carry different charger types and charging cables to manage compatibility with different makes of EVs 406. As discussed herein below, an artificial intelligence module ("AI") and the EV charging system module ("EVCS") within the MEC 402 will manage the protocols associated with the various charging parameters and driver needs.

Figure 5:
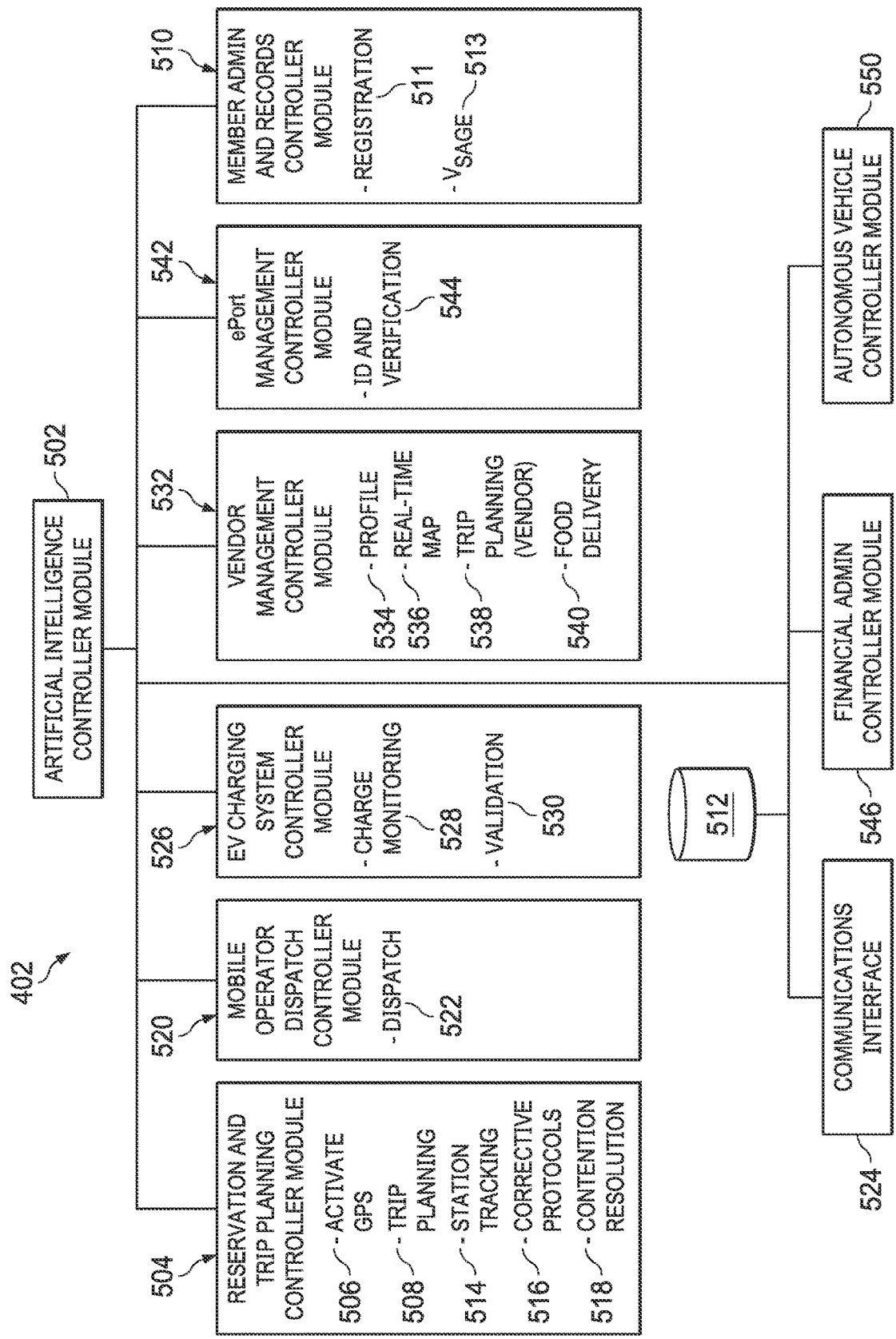
FIG. 5 illustrates a block diagram of the mobile electric vehicle charging system.

Referring now to FIG. 5, there is more particularly illustrated a block diagram of a mobile EV charging system ("MEC") 402. The mobile EV charging system or MEC 402 as defined earlier and is comprised of many controller modules of hardware and software elements, and combinations thereof that perform specific functions. MEC 402 itself operates via the cloud over the internet as either a centralized or distributed computer-based control system that is administered by the MEC system operator earlier defined as the "administrator." The administrator interacts with MEC 402 directly, wirelessly and/or remotely through the cloud using a smart device such as a smartphone or a computer such as a laptop computer.

The artificial intelligence (AI) controller module 502 is the brains of the entire MEC system 402 and manages several control modules such as depicted in FIG. 5 and these controller modules need not reside in the same computer, may be distributed across many devices and are likely operating remotely through the cloud and in some instances directly through cellular data networks. The controller modules interact with one another under the supervision or control of AI 502 and these controller modules may control other processes remotely via the cloud or via cellular data links. Depending on the implementation and use of MEC 402, the AI controller module 502 could be as simple as a hard-wired logic circuitry with limited functionality or as advanced as a self-learning computerized module that continues to improve in its decision-making relevance and accuracy over time. In addition, the intelligence and functionality of the AI controller module 502 may be distributed within or outside the physical confines of one or more computers connected either wirelessly or through direct physical connections.

The Reservation & Trip Planning ("RTP") Controller Module 504 is responsible for creating trip plans as requested by drivers. For example, upon logging into his dApp 404a, a driver may specify the start and end points of a trip he is planning with stops along the way to visit a place or places of interest. The dApp 404a requires the driver to activate his GPS function 506 on his phone, which is engaged by the RTP controller module 504. RTP 504 manages the trip planning process at 508 under the supervision of the AI controller module 502 and makes recommendations for recharging stops along the way based on driver criteria, which may have been preset by the driver and recorded in his profile within the Member Administration & Records ("MAR") controller module 510 and ultimately in the Database module ("Database") 512 as shown in FIG. 5. RTP 504 keeps track of the availability and use of all EV stations and mStations using functionality 514. The AI module 502 in conjunction with RTP 504 initiates corrective protocols 516 in response to actions during the trip as may be initiated by either the mStation 408 or the driver, or necessitated by unexpected disruptions such as road accidents, constructions, etc. When a reservation request or requests is submitted by a driver, RTP 504 will reconcile the request(s) with pre-existing parameters that may have been set by the station and mStation operators as to availability and times of operation, available charger equipment, etc and flag any reservation mismatches to AI 502 which handles contention resolution 518, and necessary communications with the associated parties.

When a Trip Plan has been scheduled by RTP 504, at appropriate times the Mobile Operator Dispatch ("MOD") Controller Module 520 will dispatch the appropriate mOperator(s) with the appropriate mStation 408 to rendezvous at the same anticipated time, or close thereto with the driver through a dispatch function 522. MOD 520 will use the appropriate means of connecting with the respective driver and mOperator whether through radio communications and/or voice/text messages, etc. using a communications interface 524. In conjunction with the AI module 502 and RTP 514, as necessary, MOD 520 will dispatch alternative mOperators/m Stations to replace errant mOperators and/or malfunctioning mStations, always in concert with AI and other elements of MEC as appropriate through dispatch function 522.

The EVCS Controller Module 526 attends to the processes of charging the driver's EV 406. EV 406 designs usually differ in make and model of EVs as each may be equipped with different battery technology, different charging mechanisms and battery management systems, capacity, etc. Thus, each EV 406 has a charging protocol that may differ from one another such as in the charging rate, ambient temperature, etc. The EVCS controller module 526 in conjunction with the AI module 502 controls these protocols. In addition EVCS monitors the amount of energy used in recharging the EV, the time of the charging sequence, etc. and updates the member's record in the MAR controller module 510 and the database 512 using charge monitoring functionalities 528. EVCS 526 controls the switching of power to the charger 302 and/or to the EV 406 upon appropriate validation of the EV and/or driver for the reserved charging session(s) through validation functionalities 530. Validation 530 will include affirmation of the member driver's ID, account status as to funds availability, restrictions imposed, functionalities subscribed for, etc.

Vendor Management ("VM") Controller Module 532 enables the management of vendors associated with the MEC 402. As an EV driver undertakes a trip his real-time position is continuously tracked and made available to subscribing MEC vendor/mVendors (collectively vendors, unless the context suggests otherwise) who may choose to promote their wares and/or services. These activities are managed by the vendor controller module 532 as well as vendor specific processes such as maintenance of the vendor profile 534 in conjunction with the database 512. When a driver makes a long trip such as from Vancouver to Denver which is a distance of over 2,000 km, an EV 406 has to recharge its batteries several times along the way. MEC 402 with AI 502 and other modules can analyze the trip plan route and propose optimum recharge locations and times along the route that would minimize the idle time spent recharging. MEC 402 maintains a real-time map 536 of all EV charging locations along the route that can be readily accessed by the driver and in conjunction with the VM controller module 532 make recommendations for appropriate restaurants near such recharging spots so that the driver may engage in a parallel activity such as dining while his EV 406 is being recharged. Alternatively, AI 502 may incorporate rendezvous with mStations 408 along parts of the route where fixed stations may be scarce or too far off the trip plan route using a trip planning functionality (vendor) 538 which will also incorporate scheduling of mVendors to rendezvous with the subscribing EV driver member. Such a trip plan may be prepared interactively between the driver and MEC 402 and may incorporate pre-registered preferences in the driver's profile within the database 512. AI 502 may also interact with the VM 532 to schedule food delivery to specific rendezvous points if the driver does not plan to use a flatbed mStation through food deliver functionalities 540. The registered mobile food vendor ("mVendor") may use his vendor mobile app ("vApp") 404*b* to interact with MEC 402 and/or with the driver and AI 502 will coordinate his delivery logistics into the rendezvous schedule in the trip plan. The MEC 402 tracks the positions of all the drivers, vendors and mOperators via their respective mobile apps 404, dApp, vApp and mApp, and AI 502 uses the position data to correlate and synchronize all the parties involved in any specific rendezvous.

The ePort Management ("EM") controller module 542 manages ePorts and IoT devices that are described in greater detail herein below and in other associated applications such as U.S. patent application Ser. No. 16/279,426, filed on Feb. 19, 2019, entitled "METHOD AND DEVICE FOR CONVERTING STANDALONE EV CHARGING STATIONS INTO INTELLIGENT STATIONS WITH REMOTE COMMUNICATIONS CONNECTIVITY AND CONTROL"; U.S. Patent App. No. 62/770,263, filed on Nov. 21, 2018, entitled "A UNIVERSAL AUTOMATED SYSTEM FOR IDENTIFYING, REGISTERING AND VERIFYING THE EXISTENCE, LOCATION AND CHARACTERISTICS OF ELECTRIC AND OTHER POWER OUTLETS BY RANDOM USERS AND FOR RETRIEVAL AND UTILIZATION OF SUCH PARAMETRIC DATA AND OUTLETS BY ALL USERS"; U.S. patent application Ser. No. 15/477,669, filed on Apr. 3, 2017, entitled "AUTOMATED SYSTEM FOR MANAGING AND PROVIDING A NETWORK OF CHARGING STATIONS"; U.S. Provisional Application No. 62/436,768, filed on Dec. 20, 2016, entitled "AN AUTOMATED SYSTEM FOR MANAGING AND PROVIDING A NETWORK OF CHARGING STATIONS", and U.S. Provisional Application No. 62/316,659, filed on Apr. 1, 2016, entitled "SYSTEM FOR MANAGING A VARIABLE NETWORK OF ONE OR MORE BRAND COMPATIBLE ELECTRIC VEHICLE CHARGING STATIONS" each of which are incorporated herein by reference in their entirety.

The ePort in its simplest embodiment is an IoT device that is used to control access to an energy source such as a 110 VAC outlet. Part of the EM control module 542 functionality includes such protocols as the identification and verification 544 of the ePort user which may be embedded in the ePort itself whereas the scheduling functionality of the ePort may be resident within the same computer system as the AI module 502. ePorts and other such IoT devices are described in greater detail in a separate invention cited above. The EM control module 542 manages the protocols and processes associated with engaging IoT-enabled charging stations such as ePorts. Other IoT devices such as a J1772 compatible adapter called a Cameo device referenced above and incorporated herein by reference may be used in both fixed location EV charging stations 412 or mobile EV charging stations ("mStations") 408.

The MAR Controller Module 510 enables member records and administration processing by the MEC 402. Only members of the MEC 402 may use the MEC and each member must register in the MEC and provide personal particulars using registration functionalities 511 as defined by the Administrator. Such particulars may include biographical and credit card data for purposes of member validation in using the MEC 402 and for payment processing as required. The MAR controller module 510 works in conjunction with the database 512 and AI 502. The MAR controller module 510 is open-ended in that profile changes and quantum of information recorded may vary over time. EV station 412 and mStation 408 usage and session incidents statistics are maintained by usage functionalities 513 and frequently reviewed by AI 502 for usage patterns that may call for marketing interventions.

The Financial Administration ("FA") Module 546 controls the payment processes of the system. Only members of MEC 402 may use MEC and each member must register in MEC 402 and provide personal biographical and financial information and pay member fees and usage fees whenever they use an EV charging station that is registered on the MEC system. The FA control module 546 manages the collection and integrity of such data as well as interaction with third party financial organizations such as banks and credit card processors, and systems such as ApplePay and GooglePay, etc and enables reporting of custom reports as desired by the various parties that use MEC 402.

The Autonomous Vehicle Control ("AVC") Controller Module 550 handles interactions and control of autonomous, self-driving mStations in the MEC system 402. As standards and protocols evolve, MEC 402 and AVC 550 will adapt. AVC 550 in conjunction with the AI 502 module and other modules will interact with autonomous mAB Stations to engage them in rendezvous with drivers. As technology and standards evolve AVC 550 will incorporate functions in step with these evolutions and extend controls and operations to different carriers and applications that go beyond merely rendezvousing with drivers to provide charging. In the example provided in FIG. 2 an mAB Station 408*c* is shown configured as a driverless van equipped with two Level-2 Chargers accessible from the outside of the van which requires intervention by the driver 406 in activating the chargers which are powered by batteries inside the van.

Figure 6:
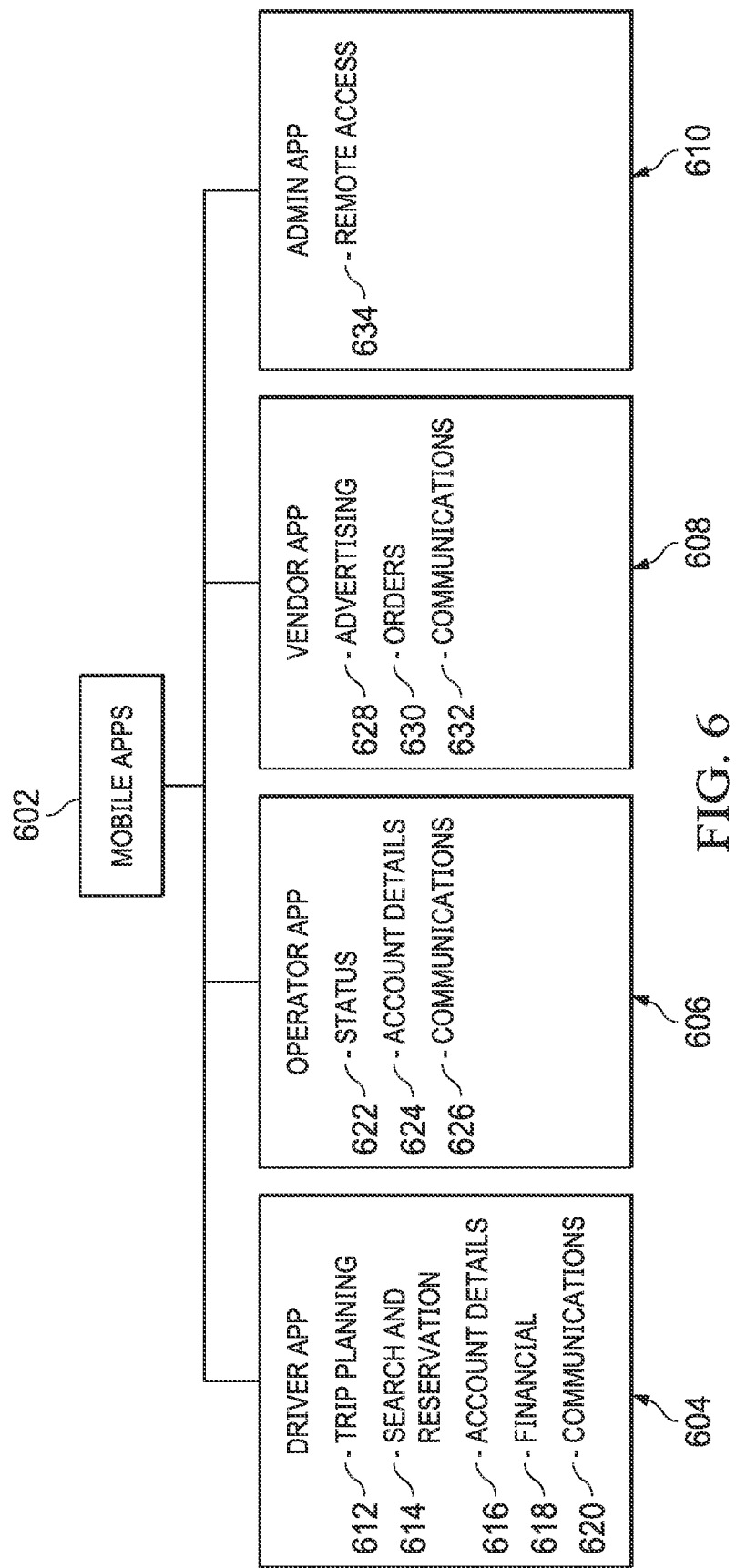
FIG. 6 illustrates a block diagram of various mobile applications used by the mobile electric vehicle charging system.

Referring now to FIG. 6, there are illustrated the various mobile app used in the invention. The mobile apps pertain to usage by different categories of users of the MEC system 402 such as the EV Driver (dApp) 604, the mOperator (mApp) 606 of an mStation, a mobile Vendor/mVendor (vApp) 608 and the MEC Administrator (aAPP) 610. In general these apps are software applications running on smart devices with wireless connectivity and access to the Internet.

The dApp 604 for drivers provides the driver with trip planning capabilities 612 for planning a trip and associated charging stops. EV station search and reservation functionalities 614 allow the driver to search for and make reservations with both mobile and fixed charging stations. The account details functionalities 616 allow the driver to access, review and manage the driver's account details within the database 512. Financial functionalities 618 enable the driver to purchase usage credits, update MEC membership, attend to vendor transaction payments, etc. The communications functionalities 620 facilitate communications with an mOperator, other drivers, other MEC users and the MEC administrator or designees.

The mApp 606 for mOperators and the mStation operators include status functionalities 622 allowing mOperators access to the MEC system 402 to change his service status (reserved, available, etc.). The account details functionalities 624 provides access to and management of the mOperator's specific account profile within the database 512. The Communications functionalities facilitate communications with drivers, other mOperators, other MEC users and the MEC administrator or designees.

The vApp 608 for vendors such as restaurants, cafes, and mobile foodtruck operators include advertising functionalities 628 enabling the ability of posting ads and running of promotions for presentation to drivers through the MEC 402. Order functionalities 630 accept orders for merchandise such as food from drivers or mobile platform operators. The communications functionalities 632 facilitates communications with drivers, other vendors, other MEC users and the MEC administrator or designees. Finally, the aApp 610 for the MEC system administrator includes remote access functionalities 634 to provide full remote access to MEC system by the administrator.

A general specifications of IoT devices, herein referred to as an ePort and Cameo, are described in the Appendix. The various details of an electric vehicle or device charging system that may be used as part of the MEC 402 is more fully described herein below with respect to FIGS. 7-27.

FIG. 7 illustrates a generic representation of an electrical device charging management system 702. The system 702 includes a central control server 704 that is responsible for providing centralized management of the charging management system responsive to a variety of system inputs. The central control server 704 manages a number of charging hubs 706 that it communicates with via a network 708 such as the Internet. The charging hubs 706 include one or more charging ports that enable an electrically powered device to be connected and charged. The central control server 704 stores a variety of information related to registered system users and their associated electrically powered devices that are to be charged at the charging hubs 706. The information collected and stored can be used for reserving charging hubs 706, controlling the charging periods of the electrically powered device connected to the charging hub 706 and for enabling payment of charging services provided by the charging hubs. The users of the system are able to interact with the central control server 704 using a mobile application 710 that is stored upon a mobile device such as a smart phone, a tablet, a laptop, personal data assistants, etc. that belongs to the user and provides the ability to interconnect with the central control server 704 via the connecting network 708 such as the Internet. The mobile application 710 would be downloaded onto the users communication device, and the user would register with the central control server 704 enabling the user to make reservations and find information with respect to the variety of charging hubs 706 that are a part of the charging management system 702 or which may be owned by other vendors that are compatible with the system. In such cases the system may only provide management and accounting and payment processes. The mobile application 710 would also enable new vendors that offer the services of charging units to register with the system.

Referring now to FIG. 8, there is more particularly illustrated one embodiment of a charging management system 802 for electric vehicles. The system 802 provides closed loop accounting of the electric vehicle charging process starting from matching the electric vehicle to the charger unit 806, reserving the charger unit, engaging the charger unit, measuring the electricity delivered from the charger unit and collecting and disbursing payment. The electric vehicle charging management system 802 includes an electric vehicle charging control server 804 that controls and manages all system operations enabling user devices to make reservations, connect with and control charging with a variety of electrical vehicle chargers 806. The control server 804 may further enable charging of electrical vehicles by appointment or charging by reservation of other types of portable electric devices. The charging management and reservation system 802 could just as well be applied to non-electric powered vehicles that utilize other types of fuel for power generation such as hydrogen fuel which requires recharging of hydrogen tanks and even gasoline powered cars may benefit from a mechanism for reserving gasoline pumps in certain circumstances such as gasoline rationing which occurred in prior periods of energy crisis. The electric vehicle users are able to interact with the system 802 using a mobile device application 808 installed, for example, on their smartphone. As discussed before, interactions between the control server 804, charging units 806 and mobile device application 808 occur over a central network 810 such as the Internet. A particular electrical vehicle charging unit 806 can provide the chargers and appropriate connections for one or more types of electrical vehicles, such as electric bikes, electric golf carts, electric motorized wheelchairs, electric shopping carts, etc.

The growing deployment of electric vehicles create a need for widespread electrical chargers 806 that are conveniently and strategically located at points of interest. The control server 704 enables a network of chargers 806 to be managed within a wireless/wired automated environment enabling individuals and/or owners of specific brands of electrical vehicles to rent out their chargers 806 for charging compatible electric vehicles. For example, an owner of a Tesla can offer other Tesla drivers the use of their home/premises charging apparatus for a designated fee. The management system 802 is able to match a user with a particular charger 806 by way of the mobile device application 808. The mobile device application 808 in addition to matching users with charging stations 806 makes use of the central management control system server 804 via the network 810 to enable the dispensation of electricity to the electric vehicles, control various electricity-metering apparatus and provide for an automated reservation, billing and payment processing mechanism for payment of use of the electrical vehicle chargers 806 to enable owners of the electrical vehicle chargers 806 to become a part of the charging management system 802.

Referring now to FIG. 9, there is illustrated a flow diagram describing the use of an electric vehicle charging management system 802 as discussed with respect to FIG. 8. Through the mobile device application 808, a user of an electric vehicle request at step 902 a location of a electric vehicle charger unit 806 that is compatible with their brand of vehicle. The charging control server 804 matches the vehicle to one or more appropriate vehicle chargers 806 at step 904 responsive to the position of the vehicle and the type of charger required to charge the vehicle. Next, the availability of the located chargers 806 is determined at step 906 to determine which of the chargers is available for charging of the vehicle. The time availability may be based upon a requested time or a projected time based upon the travel plan. Upon confirmation of the availability of the charging units 806, the user is to select one of the available charging units 806 and an appointment with the specific charging unit 806 is made by the charging control server 804, and the driver is notified of this appointment through their mobile application 808. Alternatively the user may elect to allow the system to select one of the many available 806 chargers pursuant to preset user preferences or to a system provided artificial intelligence system (AIS) which makes the election for them. Part of the appointment process may involve a full or partial payment being made by the driver's account subject to the charging functionalities of the charging control server 804. The driver may then travel to the designated charging unit 806 to obtain the vehicle charge.

Upon arrival at the designated charging unit 806, the vehicle is connected at step 910 with the designated charger that has been predetermined to be compatible with the particular electric vehicle brand that needs charging. Based on published utility rates, the amount of electricity consumed during the charge process and the location of the charging unit 806, the charging control server 804 can determine the amount to be collected from the registered driver's credit card or other registered payment sources such as PayPal at step 912 to complete payment for the charging services. Determination of electricity consumption can be facilitated by several means and mechanisms including in-line and inductive metering within the charging circuit to the electric vehicle or from data generated by the electric vehicle which may be accessible via Bluetooth or other wireless transmissions. With the advent of smart metering capability installed by utilities to monitor on premise electricity usage the electricity consumed via users using our system such information may be transmitted to our system for usage accounting and billing. Alternatively, the charging profiles from the electric vehicle manufacturer could be automatically referenced to generate an estimate of the electricity consumption that can be billed to the drivers' charging accounts for collection.

Figure 10:
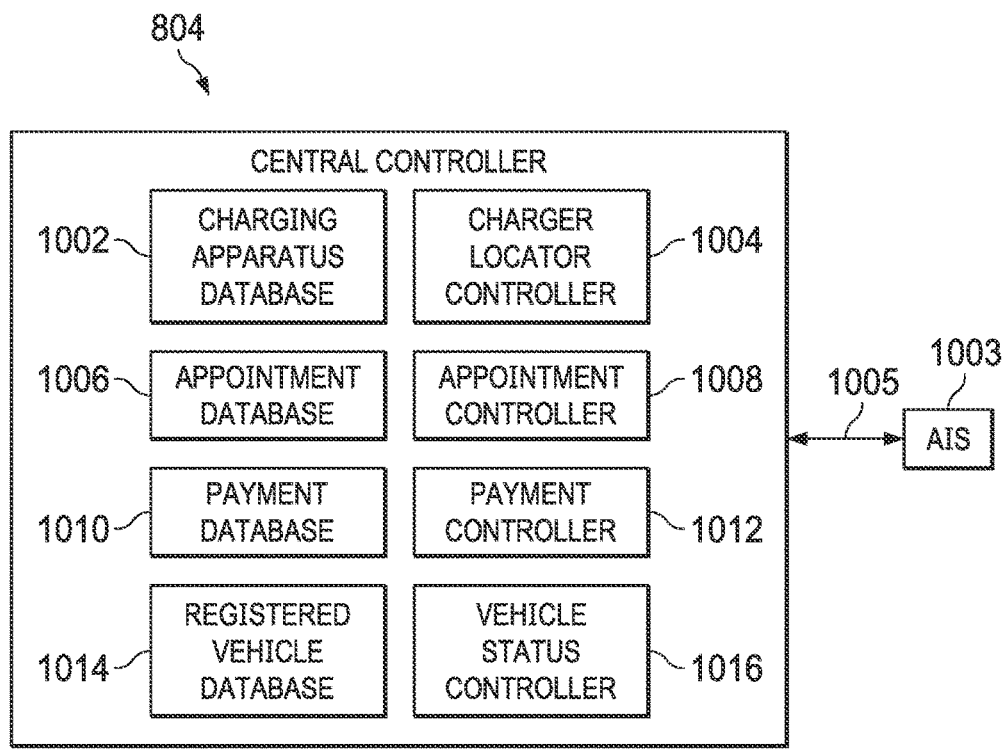
FIG. 10 is a block diagram of a central controller of an electric vehicle charging management system.

Referring now to FIG. 10, there is illustrated a functional block diagram of the charging control server 804. The charging control server 804 includes a charging apparatus database 1002 that includes all of the electrical vehicle charging units 806 that have registered with the system for providing charging locations for electric vehicles. The database 1002 includes information such as number of charging ports and the types of electric vehicles for which the charging units 806 may be used. Databases within the charging controller server 804 comprise databases that provide data for performing complex real-time matching of the location of an electric vehicle on the road and searching for a charging unit 806 to determine the charging unit that is closest to the vehicle using the charger locator controller 1004. More complex matching requests may incorporate destination routing referencing so that the electric vehicle driver may select a charger that is on the way to the electric vehicle's destination, or a mobile charging station that can rendezvous with the electric vehicle. The database 1002 may also store information related to the registered electric vehicle such as the last time the electric vehicle was charged, the state of charge to enable the system to estimate the battery exhaustion time and recommended charging locations that an electric vehicle could reach before running out of power. A charger locator controller 1004 determines charging units 806 that may possibly be utilized for charging the electrical vehicle based upon information stored within the charging apparatus database 1002 and vehicle position and type information provided from the mobile device application 808 of the driver of the electric vehicle. In addition, a link 1005 to an AIS 1003 may be provided for the purpose of providing more sophisticated trip planning that incorporates various biometric data that may prompt more frequent stops for health necessities or prior user trip patterns. With the pending availability of autonomous vehicle platforms, mobile charging stations will become available and AIS 1003 could also be used to coordinate dynamic scheduling of rendezvous points for charging the electric vehicle. The artificial intelligence system 1003 may make decisions regarding trip planning without requiring specific user input but by only relying upon provided or monitored system information.

An appointment database 1006 stores information for charging appointments that are made by vehicle drivers with respect to particular charging units 806. The appointment database 1006 indicates a charging unit 806 and times that the charging unit is presently scheduled to be charging a particular vehicle. An appointment controller 1008 generates a listing of possible appointment times for a charging unit 806 to the mobile device application 808 responsive to a user request and receives and stores a user selection for a particular appointment time for a charging unit 806 that a driver has selected.

A payment database 1010 stores payment information for registered system users. The payment database 1010 stores information required to enable payment for charging sessions via credit card, PayPal, Apple Pay, or other payment mechanisms. The payment controller 1012 controls interactions with the mobile device application 808, charging information within the charging control server 804 and the vendor accounts for the charging unit 806 enable transfer of funds from a charging vehicle to a vendor responsible for the charging unit 806 providing a charging session. Various payment schemes may be stored in database 1010 such as the use of stored credit resulting from advance deposits or some protocol for a system of membership debits and credits whereby members may opt to accumulate credits by provide charging service to other registered members and are debited when they consume electricity at a registered charging unit 806.

The registered vehicle database 1014 maintains information concerning registered users with the system 802. Each registered user would have information concerning their vehicle type enabling assistance in selection of charging units 806 appropriate for that vehicle type. Additionally, the database 1014 would include information tying the vehicle to particular charging information and other user or vehicle relevant information. The vehicle status controller 1016 monitors operation of the charging operation by a charging unit 806 to which electric vehicle is connected. The vehicle status controller 1016 can monitor the links of a charge and monitor for conditions indicating that ceasing of the battery charge is necessary due to completion of charging or problem issues requiring ceasing of battery charge.

Figure 11:
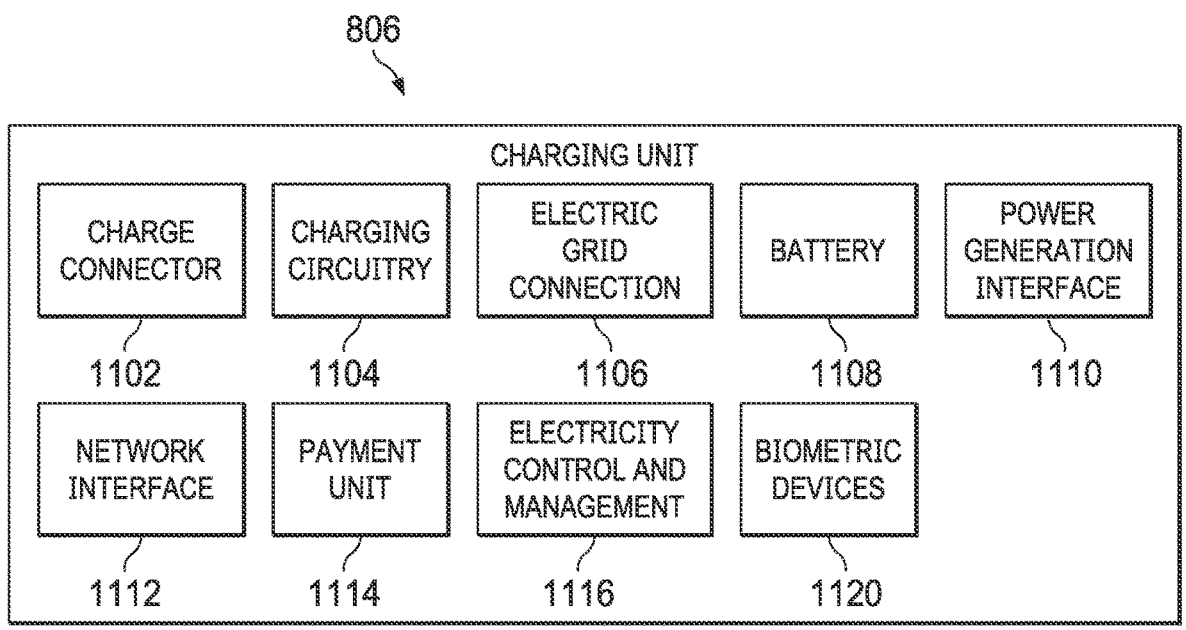
FIG. 11 illustrates a block diagram of a charging unit of an electric vehicle charging management system.

FIG. 11 illustrates a functional block diagram of the charging unit 806. Charging units 806 are available in three classes of performance, level I and II are for residential and commercial installations where single phase AC power is available. Level III electric charging units are required for quick charging of electric vehicles in minutes. Level III charging units utilize three-phase AC power which is usually only available at a business or commercial premises. A typical level I or level II charger will fully charge an electric vehicle in several hours. The charging unit 806 will include a charge connector 1102 for connecting one or more different types of electric vehicle to charging circuitry 1104. The charging circuitry 1104 generates the charging voltage provided to the vehicle. The charge connector 1102 can be a single or multiple vehicle connection depending upon the capabilities of the charging unit 806. The charge connector 1102 may comprise, but is not limited to, NEMA 15, Tesla, NEMA 50, J1772, SAE Combo, CHADeMO, NEMA 20, etc. connectors.

Charging circuitry 1104 utilizes power from either the local power grid or a local battery source to generate a charging current that is output via the charge connector 1102 to the electric vehicle being charged. The charging circuitry 1104 can receive the charging power from either the electrical power grid via an electric grid connection 1106 or a local battery 1108. The electric grid connection 1106 would comprise a standard power interface to the local power grid. A battery 1108 would locally store electricity that was provided via some type of power generation interface 1110 or from the electric grid connection 1106. The power generation interface 1110 could be connected to a solar, wind or other type of power generation system. Alternatively, the system could switch between the alternative power generation interface 1110 and the electric grid connection 1106 based upon low tariff periods from the electricity grid. Thus, the charging unit 806 would connect to the electric grid during low tariff times and utilize the alternative power generation interface 1110 during higher tariff times.

A network interface 1112 provides for a wireless or wired connection to the charging control server 804 to enable communications and operations occurring between the databases and controllers therein and the control functionalities within the charging unit 806. The network interface 1112 utilizes powerline communications technologies and wireless technologies such as Wi-Fi, 3G/4G data services, GPSS and other mapping technologies. A payment unit 1114 comprises an interface for manually entering user information or a credit card reader enabling the taking of point of sale payment information from a driver that desires to charge their electric vehicle. Payment may be taken via cash, check or credit card using the appropriate payment collection protocols, or even membership debits and credits. The payment unit 1114 may also be used for driver validation by enabling the authorized driver to manually enter a validation code that is sent to the driver by the system. Such validation may also be effected via the mobile device application 808.

Each of the system components are under control of an electricity control and management unit 1116 that is responsible for controlling all inter-charging unit operations and operations between the charging unit 806 and the charging control server 804. The electricity control and management unit 1116 enables the dispensation of electricity, detects the amount of electricity consumed and transmits this information through the network 810 using mechanisms such as powerline communications, and Wi-Fi, 3G, 4G or other prevalent data networks to the central controller 804 for storage within the various databases. The electricity control and management module 1116 includes current sensors on the AC lines delivering power to the charging vehicle to measure the level of charge being delivered and provide electronic clocks that may be used to measure the duration of electricity dispensation. Information collected, used and transmitted during and after the matching process includes data on the electric vehicle connector type, the charging units characteristics, local utility electricity rates, electric vehicle identification protocols, dispensation duration, as well as characteristics of the charger behavior which may affect maintenance of the charger, etc. Alternatively, a fixed amount of charge can be implemented in discrete blocks of time, for example 30 minute increments, to control the electricity dispensation using a simple timer switch.

Biometric devices 1120 may also be used for validating a user connecting with the charging unit 806 and enabling initiation of the charging process. The biometric devices 1120 may comprise devices such as fingerprint scanners, voice recognition devices, retinal scanners, etc.

Figure 12:
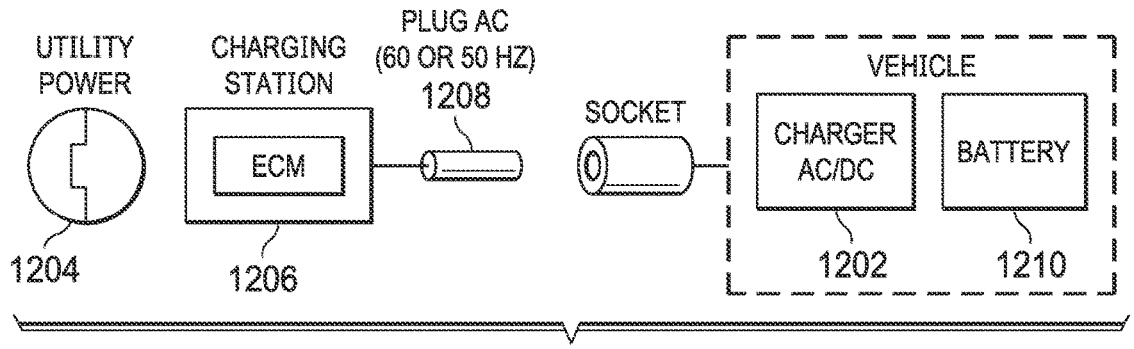
FIG. 12 illustrates an AC coupled charging unit.
Figure 13:
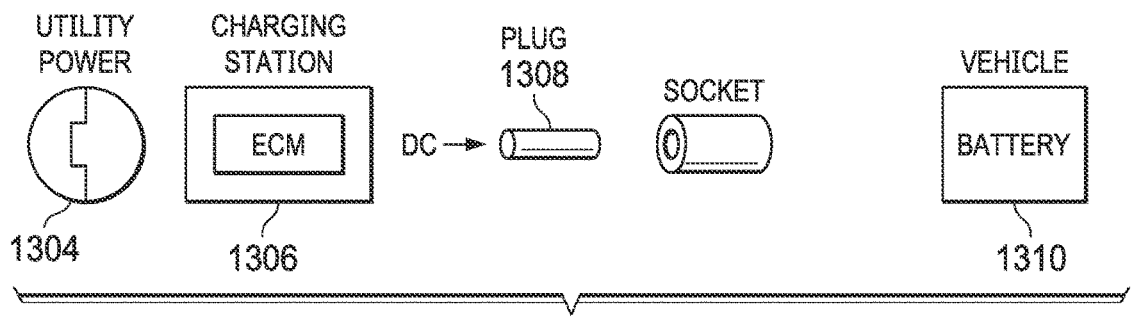
FIG. 13 illustrates a DC coupled charging unit.
Figure 14:
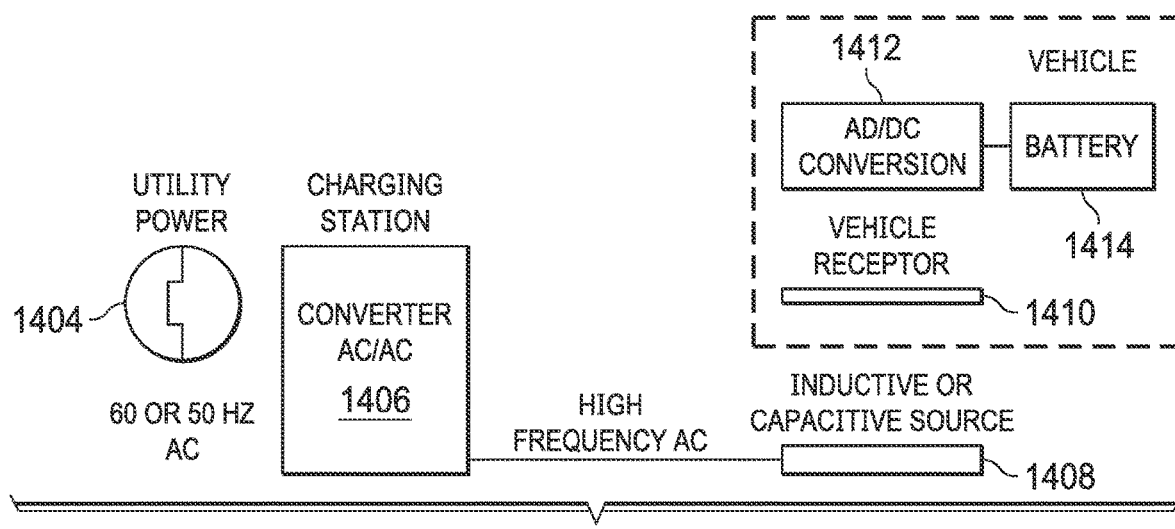
FIG. 14 illustrates an inductively or capacitively coupled charging unit.

Referring now to FIGS. 12-14, there are illustrated components of the system for three different modes of coupling between the electric vehicle with a converter depending on the electric vehicle's onboard electricity storage system. As shown in FIG. 12, if the electric vehicle has a built-in converter 1202 to convert the incoming AC power from the utility power 1204 into DC power, the charging station 1206 only needs to output AC power with the appropriate connector plug 1208 voltage to charge the battery 1210. If the electric vehicle requires DC power for charging, the electric power provided from the charging station 1306 responsive to the utility power 1304 comes from a DC power output mechanism at the appropriate voltage from the connector plug 1308. The plug connection 1308 provides the DC charging voltage directly to the battery 1310.

In addition to the directly coupled electric vehicle charging configurations of FIGS. 12 and 7, an inductive or capacitive charging system may be used wherein the utility power 1404 provided to the charging station 1406 is inductively or capacitively coupled to a vehicle through an inductive or capacitive source 1408 and vehicle receptor 1410. An AC to DC conversion unit 1412 within the vehicle converts the AC power into a DC component for charging the battery 1414. Note that all three charging situations of FIGS. 12-14 utilize a charging station including an electricity control and management system 1116 that provides the necessary electrical power conversion and regulation as necessary, turns on/off the charging power, measures the amount of electricity dispensed and performs other control functions such as monitoring the charge data for the vehicle via data gathered from the vehicle during charging. Such data may be gathered wirelessly or via a connecting cable that connects the electric vehicle to the charging unit.

Figure 15:
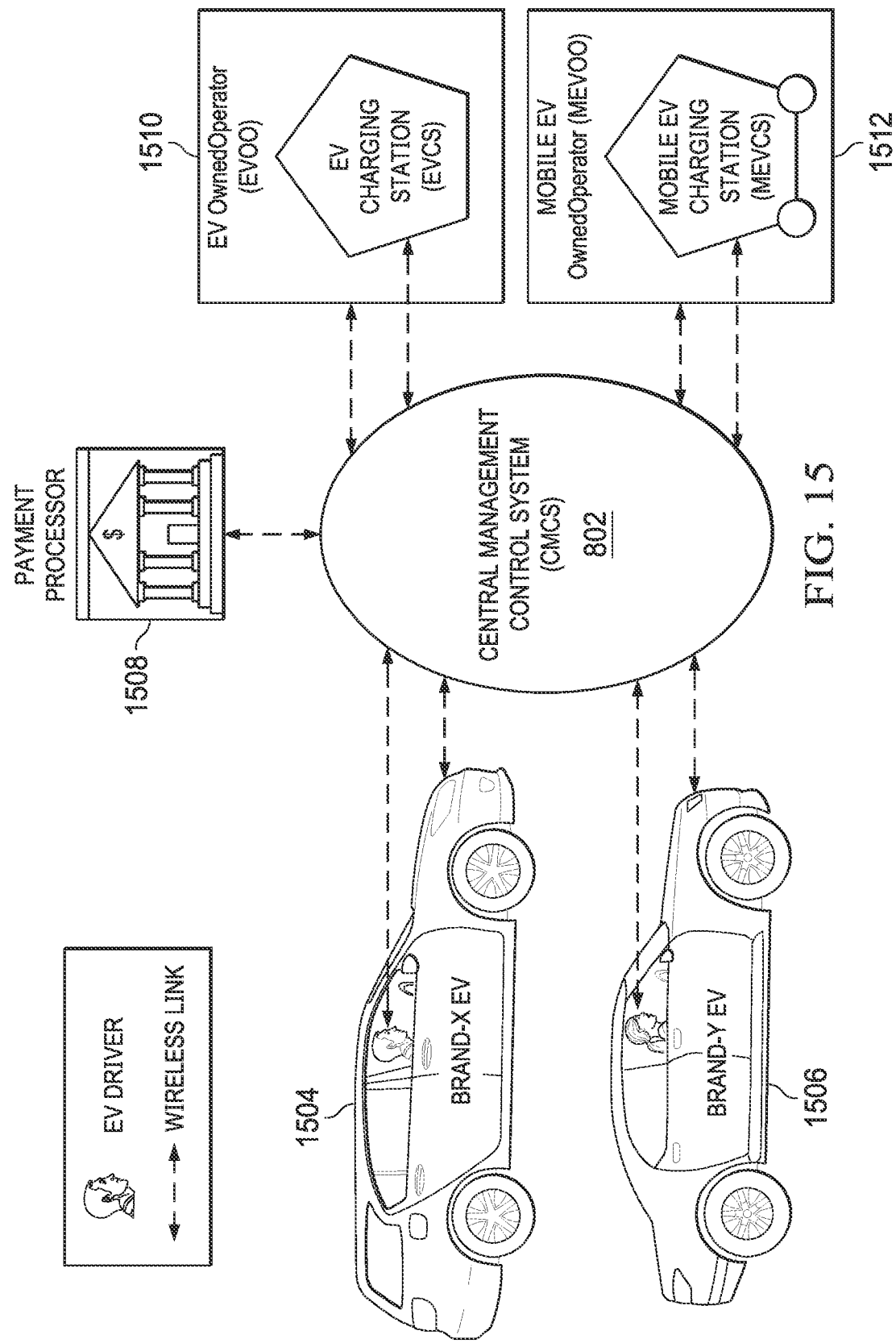
FIG. 15 illustrates a central management control system and its interaction with electric vehicle charging management system components.

FIG. 15 illustrates the main components of the charging system wherein the various components are wirelessly communicating with the charging control server 802. The charging control server 802 is the brains of the system and maintains a database of components including the profiles of the drivers and the charging units along with the locations of the charging units. The charging control server 802 monitors each transaction from start to finish, records the time of charging, performs payment processing and continuously collects information from the network components. The charging control server 802 wirelessly connects to different brands of electric vehicles 1504, 1506 through the mobile application and with the payment processor 1508 to carry out payment for charging services. Further, wireless connections may be between the owners and operators of various electric charging stations 1510 at fixed locations or mobile electric charging stations 1512 that may actually come to stranded vehicles to provide charging or to dynamically schedule and coordinate rendezvous between travelling electric vehicles and mobile charging stations. The mobile chargers 1512 utilize onboard storage devices or generators enabling the mobile system to provide charging services wherever it is needed such as an electric vehicle rally, county fair, golf course or tournament where electric carts need charging, etc., or wherever electricity might be needed. By coupling onboard energy collection sources such as solar panels or wind turbines, a mobile charger 1512 could operate indefinitely away from a power grid. These mobile chargers 1512 provide a roving charging station on a moving platform such as a truck equipped with fossil fuel motorized electric generators or a bank of batteries that are either charged from the normal grid outlet such as 110 V AC wall circuit and/or are continuously charged on the road via onboard solar panels or energy collection mechanism such as wind turbines or the vehicles 12 V DC output.

The electric vehicle network management and charging system 802 provides the ability to match brand specific electric vehicles with brand compatible charging units and schedule an electric vehicle charging session. The system 802 also provides the means of matching and enabling non-electric vehicle owners who buy third party charging units to become independent operators operating on their own schedule to provide charging services. The system 802 will deliver the same transaction experience to those using brand specific electric vehicles and charging units by scheduling the transaction, measuring/metering and dispensing the electricity consumed, collecting and disbursing payment for consumption, recording the incident and tracking the process. The system 802 will provide for electronic record-keeping and payment processing. Payment mechanisms are universally available from third parties including the use of on-site magnetic card readers, smart chip card readers and even online Internet data entry through third-party portals for payment processing. Prepayment options are also available by pre-registering the electric vehicles payment options which then merely require the completion of agreed-upon payment protocols.

In another embodiment, the system may utilize modules of removable batteries wherein electric vehicle may simply exchange charge depleted batteries for a set of fully charged batteries, and thus eliminate the waiting time associated with charging the electric vehicle's onboard batteries. When such electric vehicles are available as well as the battery modules, the system will utilize a battery exchange system to exchange batteries using the mobile applications and central controller described hereinabove with such modular batteries that are matched with their modular electric vehicle that may accept the batteries.

Figure 16:
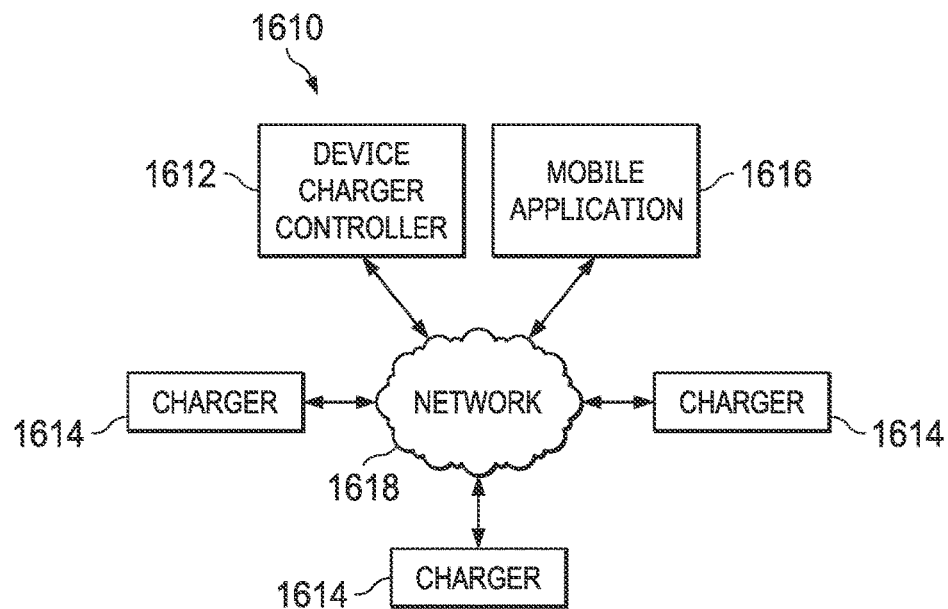
FIG. 16 illustrates a medical/mobility device charging management system.

Referring now to FIG. 16, there is illustrated an alternative embodiment of a system 1610 for managing a network of charging stations for personal electric devices such as personal mobility devices, personal medical devices, and personal media devices such as mobile phones, electronic tables and laptop computers. The system 1610 includes a central device charger controller 1612 that controls all charging operations between a plurality of charging units 1614 through a network 1616, such as the Internet. Individual users may establish appointments with the various charging units 1614 using a mobile application 1616 stored on their personal mobile devices. The mobile application 706 communicates with the central device charger controller 1612 and charging units 1614 through the network 1616. The system 1610 enables and facilitates the charging of electric devices at locations which provide charging facilities that can be reserved for use at predetermined times or opportunistically as availability permits. The charging units 1614 are provided at locations in or around where a user intends to engage in some activity such as those offered at recreational or food and beverage sites among other establishments, or in general where the user intends or expects to be spending an extended length of time to provide an effective charging cycle. However, the system 1610 is not restricted to such locations as such charging units 1614 may be rented out by the owner or operator for use at the user's option and pleasure. More simplified versions of charging units 1614 may simply be a battery for use in the user's device, or even for a battery exchange system as described herein above.

The network of charging stations 1614 are located within or near the property of a service provider such as a restaurant, cinema, concert hall, etc., or are transportable and can be reserved by a personal mobility device user prior to the user's visit at a particular vendor location. The user makes reservations for use of a charging unit 1614 via the mobile application 1616 which enables the user to connect to the central device charger controller 1612. The charging unit 1614 contains electronics and switches that control the dispensation of an electric charging current to the subscribing user's personal electric/electronic device under control of a central control module having functions that are incorporated within the device charge controller unit 1612. Each charging unit 1614 may contain several connectors that can be controlled from a single centralized controller. Each connector may have different connector configurations for connecting with different devices having different charging protocols.

The mobile application 1616 provides position information using various applications such as GPSS applications, cell tower triangulation techniques or using location sensitive beaconing technologies such as Apple Computer's Bluetooth app iBeacon. Typically, the application 1616 is downloaded to a mobile communications device such as a smart phone or electronic tablet. The application 1616 and central device charger controller 1612 enable the system to employ Internet of Things (TOT) protocols and methods to enable and provide for a range of services to the user who subscribes for such services via online registration through the application.

The system 1610 uses the network 1618 to provide shared computer and communication resources and to maintain databases within the device charger controller 1612, as will be described more fully herein below, for all subscribing vendors and system subscribers. Before registering a vendor, the vendor's venue must be audited as to the feasibility of providing charging unit services. The vendor must have Internet connectivity to become part of the system and may opt for other wireless communications methods such as Wi-Fi, and/or Apple computers app iBeacon that facilitates sending digital beacon messages from the vendor to the user. The vendor must also set aside or install specific electrical outlets and space to accommodate the secure and convenient charging of one or more personal electric/electronic devices at their premises or venue. The vendor would initiate the registration process using a mobile application 1616 in a similar manner that a new user would register with the system.

The installation of a beacon-like application on the user's smart device enables the system to provide the user with enhanced services. The electricity provided through the designated outlets is accessed, controlled and regulated via a device and/or software either within the vendor's premises equipment or in an external apparatus that connects with the system. The vendor, such as a restaurant operator that caters to electric wheelchair users, would designate specific wheelchair accessible tables which either incorporate one or more charging ports or in some cases the vendor might deploy their charging units at convenient personal mobility device parking areas provided the vendor also has a means for enabling the visiting user to be transported to the activity venue. All such information is part of the specific event venue profile and may be displayed on the user's mobile application 1616.

In the case of a personal mobility or medical device the charging unit 1614 employs Internet of things (IOT) technology to communicate with the central device charger management controller 1612. The charging unit 1614 also communicates with the personal mobility device in such cases wherein the personal mobility or medical device has built-in communications capability such as Bluetooth or Wi-Fi. In such cases, there may be a need to cooperate with the specific personal mobility or medical device manufacturer in order to obtain the personal devices' API (application program interface). Access to such APIs may be required to enable the system's sophisticated features such as trip planning so that the system can determine and correlate the real time charge state of the personal devices' battery and trip characteristics such as the average speed of travel among other measurement parameters for a personal mobility device or the rate of battery drain and medication consumption as in the case of a personal portable medical device user.

The system 1610 incorporates other positioning technologies for such purposes including beaconing technologies and wheel mounted odometers to enable the determination of distances traveled by the personal mobility device based on revolutions of the wheel. Other means of providing such information may utilize third-party apps such as Google maps whereby the system can derive the personal mobility devices position and travel progress via the user's smart phone GPSS system. IOT capability may be deployed in several elements of the vendor's equipment portfolio. Other methods and apparatuses may be used to garner the necessary personal mobility device travel and battery state data to determine the distance traveled and other apparatuses' real-time battery state and charge logging. Additionally, the central management controller would measure the quantity of electricity consumed by the personal mobility device during the charging session.

Figure 17:
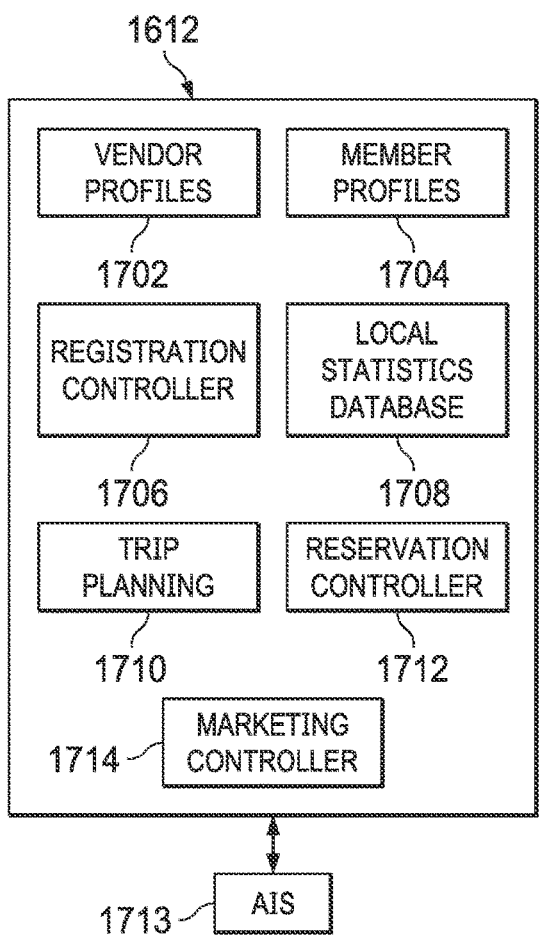
FIG. 17 is a block diagram of a central management server of a medical/mobility device charging management system.

Referring now to FIG. 17, there is illustrated a functional block diagram of the central device charger controller 1612. The controller 1612 includes databases of vendor profiles 1702 and member profiles 1704. The vendor profiles 1702 store information concerning charging units 1614, and the individuals controlling operation of the charging units. The member profiles 1704 include information about users who have registered their personal mobility devices, personal medical devices or other electric devices for charging through the device charger controller 1612 and charging units 1614.

The local statistics database 1708 stores information relating to the neighborhood surrounding charging units 1614. This information may comprise information such as the availability of handicap parking near the particular vendor providing the charging unit or locations of personal mobility device accessible washrooms and other amenities such as restaurants and shops located nearby. Locations of nearby medical facilities that can provide treatment and services specific to the needs of a specific personal mobility device or personal medical device users will also be displayable through the mobile application 1616 in the event that the user is in need of medical intervention. Because of the user's dependence on the personal mobility device, the system could also provide the locations of nearby personal mobility device shops for parts and service and their hours of operation.

Registration controller 1706 is responsible for enabling new users to register with the central device charger controller 1612 after they have downloaded the mobile application 1616 to their personal mobile device. Trip planning controller 1710 enables a user to interact with the central device charger controller 1612 through their mobile application 1616 to plan a trip between locations and locate charging units 1614 located in close proximity to the trip route. Once various charging units 1614 are located that correspond to the trip plan, the reservation controller 1712 enables the user to make a reservation for a particular charging unit 1614 at a particular time through the mobile application 1616. An AIS 1713 may be utilized to provide more sophisticated trip planning that incorporates biometric measurement and monitoring to facilitate intervention for medical or other reasons. Marketing controller 1714 generates programs for marketing particular services to users by pushing information from the charger controller 1612 to the mobile applications 1616.

Figure 18:
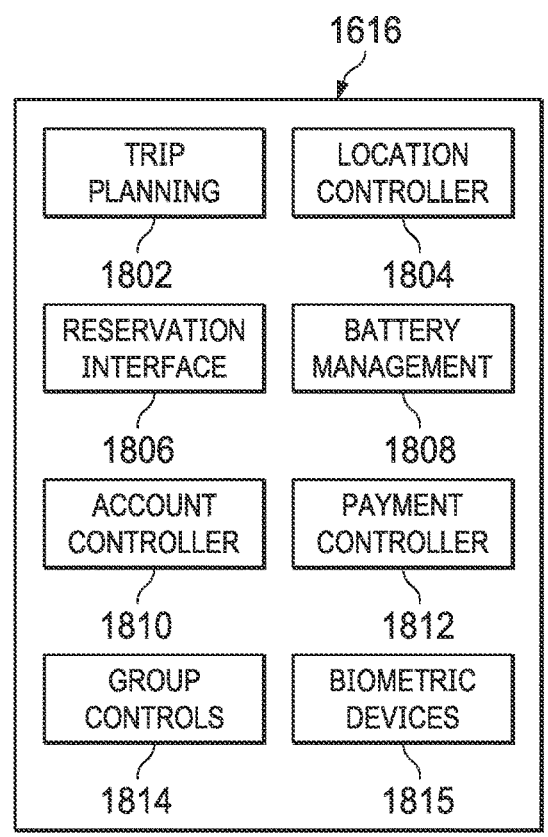
FIG. 18 is a block diagram of a user application of a medical/mobility device charging management system.

FIG. 18 illustrates a functional block diagram of the mobile application 1616 stored upon a personal mobile device. The application 1616 includes trip planning functionalities 1802 enabling a user to plan and locate charging units 1614 in conjunction with the device charger controller trip planning functionalities 1710. The trip planning functionality 1802 enables a user to search for charging unit enabled establishments/locations to make bookings and reservations for use of a specific charging unit 1614. The trip planning functionality 1802 utilizes charging units 1614 availability around the specified area and may be carried out manually by user selections or automatically/semi-automatically with assistance from the trip planning controller 1710 within the device charger controller 1612 and in conjunction with AIS 1713. Utilizing user inputs of estimated times to be spent at each portion of a trip, the trip planning functionality 1802 in conjunction with the trip planning controller 1710 of the device charger controller 1612 provides advice on a sequence of charging stops and the optimum time and duration to be connected to a charging unit 1614. Upon user confirmation of a trip plan, the system will make the necessary reservations utilizing communications between the reservation interface 1806 of the application 1616 and the reservation controller 1712 of the device charger controller 1612 at the appropriate charging unit 1614. AIS 1713 may be employed to make trip adjustments dynamically in reaction to trip actualities.

The location controller 1804 enables the mobile application 1616 to determine a current position of the mobile device housing the mobile application. The location controller 1804 makes use of global positioning or other positioning functionalities to determine a terrestrial location of the personal mobility device, personal medical device or other electric device for charging. This is useful in locating charging units 1614 that are in a current proximity to the user. The reservation interface 1806 enables the mobile application 1616 to generate a reservation for a particular charging unit at a particular time. The reservation interface 1806 interacts with the reservation controller 1712 of the device charger controller 1612 in order to locate available charging units 1614. AIS 1713 may be engaged to direct 1806 to make the necessary reservation changes.

Battery management controller 1808 makes calculations and determinations with respect to a user current battery charge for a personal mobility device or personal charger device. The battery management controller 1808 determines when a last charge of the device occurred and based upon known discharge characteristics generates alerts and provides notifications to users when recharging of their personal mobility device or personal medical device is necessary in order to avoid the devices becoming completely discharge and stranding the user or placing them in a medical emergency situation. The battery management controller 1808 controls battery management and provides proper charging sequences, conditioning and protection. The battery management controller 1808 assesses battery to charger compatibility, provides charging management and provides real-time feedback and reporting on the charging process and level of the charging device's battery charge so as to alert the user when the battery reaches specified user established threshold triggers or if the battery is impaired. This management and control by the battery management controller 1808 also ensures that the charging process is consistent with the various battery chemistry and technologies used in the respective batteries. Such control may also be moderated on demand to affect the charging rate for the battery such as to enable vendor discretion for pricing their services on the basis of fast or normal charging rates. The battery management controller 1808 may also provide automatic cutoff of the charging process when anomalies are encountered to prevent hazardous events.

The account controller 1810 stores user account information enabling a user to login to the device charger controller 1612 in order to obtain charging services. The account controller 1810 provides real-time account access by vendors and users as to their individual accounts to obtain charger usage and financial information and management. For example, the current status for a charging unit reservation and utilization may be obtained by the vendor. Users may obtain reservation status and carry out actions such as charging to a credit card and/or debiting a bank account with a predetermined booking fee in order to credit the amount to the system and reserve a predetermined portion of the transaction fee for the serving vendor. Payment controller 1812 stores payment information for the user enabling them to utilize the mobile application 1616 to automatically pay for and obtain charging services using for example credit card information, PayPal information, automatic bank draft information or other payment protocols such as Apple Pay, etc.

The group control functionality 1814 provides for social media interactions and group socializing of system users. Group socializing such as the coordination of user activated group activities and/or assembly when the invited individuals are allocated to specific charging units 1614 for charging. Things such as group gifting capabilities may be facilitated to enable users to coordinate a group gifting campaign for a user, or anyone else that has an email address and/or mobile phone number. The group control functionality 1814 also provide the ability to offer other group apps by third parties such as SPOND or Evite to enable group gatherings to be offered through the system 1610. Group controls 1814 could also provide neighborhood watch capabilities whereupon a user can automate the setting of alarm that is broadcast to one or more individuals whenever a trip plan is violated as to time of expected arrival and expected trip stop location as might occur when an elderly personal mobility device user gets forgetful and strays from their planned activities. Biometric measurement devices 1815 may also be used to provide indications for the need of medical or health related interventions. In such situations, the system could be programmed to send out a distress signal to either the police, and/or other preset emergency contacts. Distress signaling could be provided to alert care practitioners and/or emergency responders when a user's biometric condition triggers preset thresholds. The biometric devices 1815 may also be used for validating a user and enabling initiation of the charging process. The biometric devices 1815 may comprise devices such as fingerprint scanners, voice recognition devices, retinal scanners, etc. The group controls 1814 also provide aggregation or grouping of various personal mobility device accessible establishments and provide advertising services to such establishments to coincide with trip plans that a user may establish using the trip planning functionalities 1802.

Figure 19:
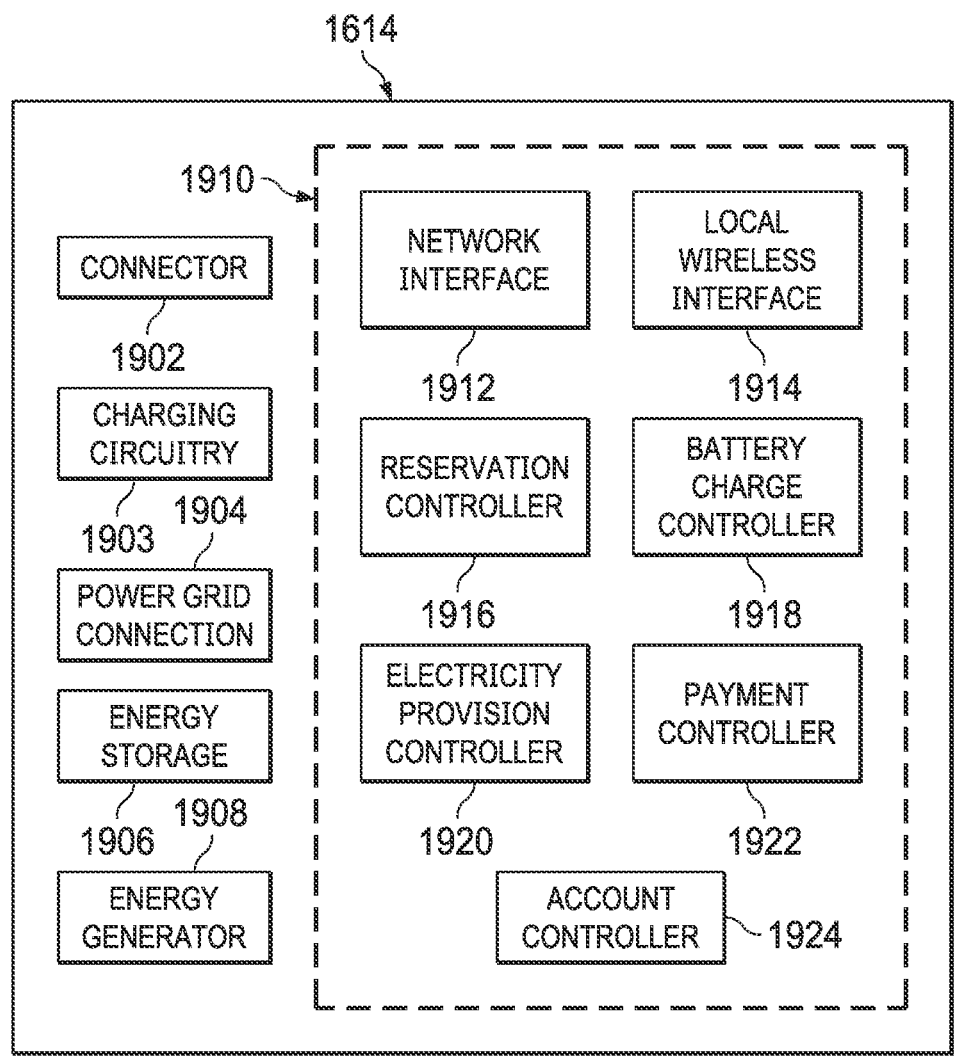
FIG. 19 is a block diagram of a charging unit of a medical/mobility device charging management system.

FIG. 19 provides a functional block diagram of the charging unit 1614. A connector 1902 enables the charging unit 1614 to connect with a device that is being charged. The connector 1902 provides charging current from the charging circuitry 1903. The charging circuitry 1903 generates the charging current from a provided energy source. The connector 1902 can be of one or a plurality of types to enable the charging unit 1614 to connect to a variety of different personal mobility devices, personal medical devices or other types of electrical devices needing charging. A connector 1902 may provide direct, inductive, capacitive coupling or other state-of-the-art over the air technologies for charging the device being charged. The connector 1902 may comprise several connections under control of the central control module 1910. Each of the plurality of connectors may employ different connector configurations for connecting personal mobility devices as different personal mobility devices may employ different connecting plugs and also contain different types of batteries (such as sealed lead acid (SLA) or lithium ion battery chemistry), different battery capabilities and different battery charging voltages and charging protocols.

The central control module 1910 provides a range of battery charging management and control protocols and functionalities for regulating the charging process as well as to monitor the personal mobility devices battery charge state to prevent overcharging which can lead to fire and explosions. Power grid connection 1904 connects the charging unit 1614 to the electrical power grid. The power grid connection 1904 provides a connection to the power grid that enables the charging unit to charge a connected electrical device using a generated charging current.

In addition to receiving electrical charging energy from the power grid, energy generator interface 1908 enables connection to an alternative energy generation source such as solar cells, a wind turbine, a gas powered generator, etc. Energy storage batteries 1906 may be used for storing energy for charging a connected electrical device without requiring an active electrical power connection. The off grid power provided by batteries and/or other energy storage devices can be regularly charged by solar panels or other renewable energy power generators such as wind turbines or even fossil fuel power generators. Offered power may in fact also be provided by user devices whereby one personal mobility device may be used to transfer power to another personal mobility device whether singly or in a ganged or combined fashion. The concept is not restricted to personal mobility devices but may also be applied to all portable or transportable user devices for inter-device charging. The batteries may be charged from a connected alternative energy source through the energy generator interface 1908 or through the power grid connection 1904.

A central management controller 1910 includes all of the central control functionalities for controlling the operation of the charging unit 1614 responsive to control information from the central device charger controller 1612 and mobile applications 1616. Communications with the central device charger controller 1612 and mobile applications 1616 are carried out through a network interface 1912 enabling communications over the network 1618. Further communications to the network 1618 or local devices may also be carried out through a local wireless interface 1914 using Wi-Fi, Bluetooth or other wireless communications protocols or through the powerline itself. The reservation controller 1916 enables information to be exchanged regarding the establishment of a reservation by a user, validation of the user upon arrival at the charger 1614 for charging, and notification of the reserved status of charging unit 1614 at a particular point in time at which a reservation has been granted. The battery charging controller 1918 controls the battery charging process when an electrical device is actually connected with the charging unit 1614.

Upon validation by reservation controller 1916 of the valid connected device and user member that made the reservation the electricity provision controller 1920 works in conjunction with the charging circuitry 1903 to regulate the flow of electricity to the device's battery. The electricity provision controller 1920 has the ability to regulate the flow of electricity in such a manner as to manage the charging of the users device battery that are connected to the charging unit 1614 so as to optimize the charging process or simply to regulate the speed of charging based on pricing and payment protocols. This process is facilitated by the incorporated data communications capability of the local wireless interface 1914 using Wi-Fi, 3G, 4G, Bluetooth etc. Payment controller 1922 provides point-of-sale functionalities enabling a user to pay for charging services received by their electric device. The payment controller 1922 may be in the form of a magnetic strip or smart chip reader that reads information from a credit card or a data entry terminal that receives information from a user's mobile application or enable manual entry relating to payment information that is used to charge a user's account. The account controller 1924 provides access to user account information based upon information received from the mobile application 1612 that has requested a charging time or is providing payment information.

In the case of the charging of large capacity battery powered personal mobility devices such as electric wheelchairs and scooters for the mobility impaired, such personal mobility devices typically take a long period of time to charge but are quick to discharge in use due to the unpredictable energy consumption modes. In such cases where the charging time required is long and there is a physical or medical dependence on the device by the user, the utility of being able to reserve a charging port becomes more of a necessity rather than a convenience. Consider the case of an electric wheelchair user, or the user of a portable oxygen concentrator (POC), a respiratory device for chronic obstructive pulmonary disease sufferers which requires the need of a charge while the user is out of their home. The user dependence on his wheelchair or POC precludes leaving the device to be charged while the user engages in an activity; unless the user has a spare device to use while their other device is charging or the user is participating in an activity at the charging station itself such as a eating dinner at a restaurant or watching a show at a theater.

Using the mobile application 1616 and device charger controller 1612, the user is able to reserve a charging port in advance for a predetermined time where the user knows they will be present at or near a specific charging facility. The user may also charge their device at the establishment when they are engaged in an activity at a location, such as dining at a restaurant, for a particular period of time. One of the features of the system is the assisting of the user in determining the optimum time for recharging which coincides with a period of immobility such as eating dinner in the restaurant that includes a charging unit and/or has the ability to facilitate charging services. The described system has tremendously broad utility and applicability to any and all rechargeable devices. While the disclosure is made with respect to rechargeable electric motor powered personal mobility devices for mobility impaired individuals or personal medical devices, the concept described herein is applicable to other types of electrically rechargeable devices that store energy and require recharging or energy refurbishment. The concept described herein is also applicable to other modalities of energy storage and dispensation such as hydrogen gas or other compressed fluids.

Figure 20:
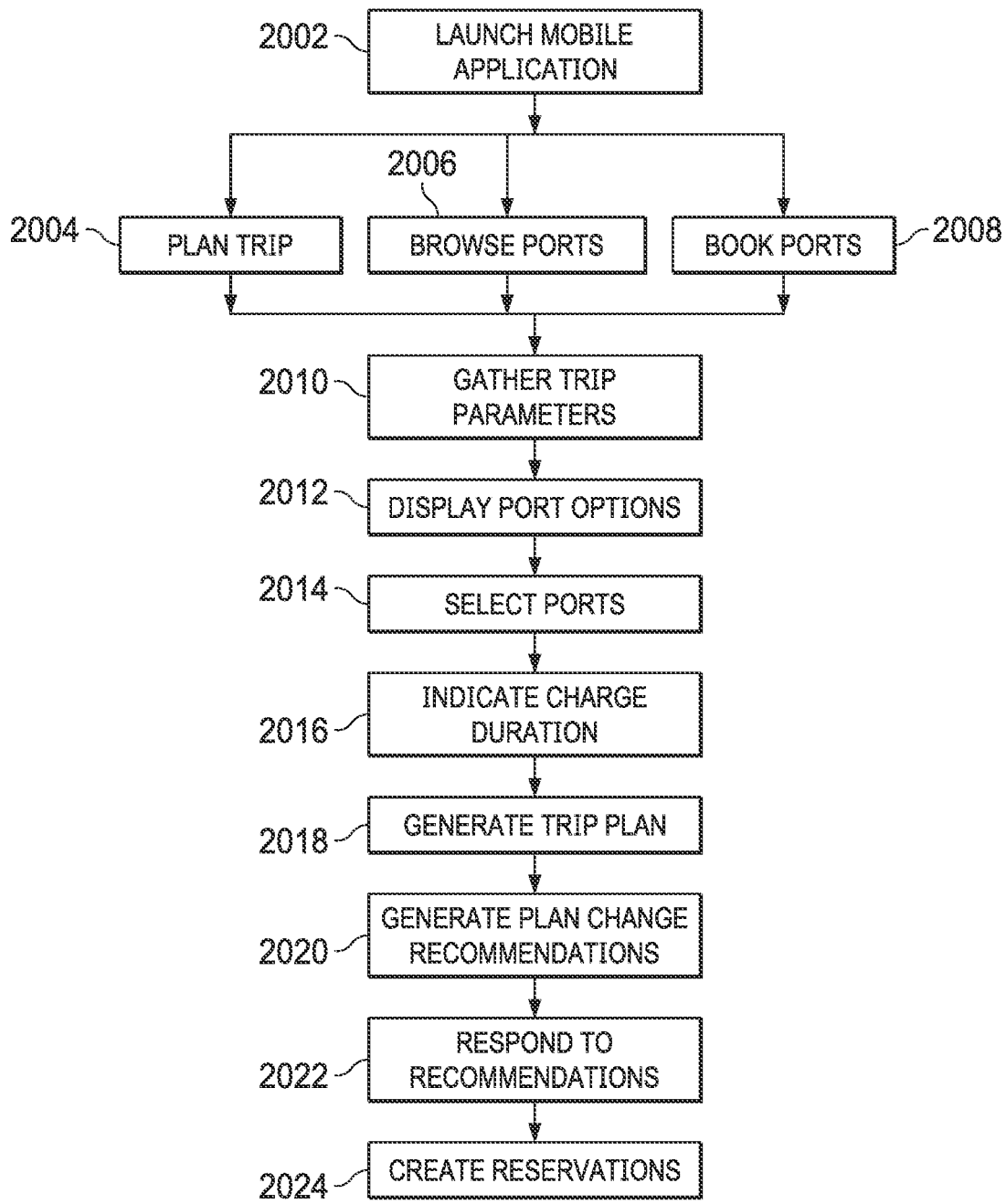
FIG. 20 is a flow diagram illustrating the process for generating a reservation in the medical/mobility device charging management system.

Referring now to FIG. 20, there is illustrated a flow diagram of the process for generating a reservation transaction. The system concept may be applied to a wide variety of rechargeable devices, and the utilization of the features of the system are very diverse. In the example of a personal mobility device user, one such feature of the system which is accessible via the mobile application 1616 is to plan a trip that encompasses various trip stops for charging the personal mobility device during the course of the journey and to coincide those charging periods with a specific stationary activity such as dining, drinking, reading or viewing a movie. During these times a personal mobility device is connected to a charging port and is being charged during the user's activity. A user launches at step 2002 the mobile applications 1616 on a smart phone or other communications devices such as electronic tablets and reviews several action options available for execution such as plan trip 2004, browse charging units 2006 or book charging units 2008. The user selects, in one example, browse charging units at step 2006 and asks for destination and area coverage at step 2010 to gather various trip parameters enabling them to make a charger selection. The coverage area may be viewed in miles, yards or even metric dimensions. The user application 1616 displays at step 2012 the various locations that include charging units. The user browses the available destination points that they intend to visit during their trip to make sure that charging units 1614 are available during their trip.

Once satisfied with the availability of charging units 1614 at the specified trip stops, particular charging units 1614 are selected at step 2014 for the trip. The application 1616 asks for the expected duration spent at each charging unit at step 2016 and upon user confirmation, a trip plan is generated at step 2018 that lists the recommended sequence of trip stops and the times allocated at each stop. The user can also generate trip plan change request/recommendations at step 2020 to charging units 1614 that have not been made a part of the generated trip plan. Based upon considerations of the stop length times and expected lapse times and battery drain, the system will specify the trip plan at 2018 and provide recommended times for a charging appointment. The user can confirm the recommendation at step 2022, or alternatively, generate plan change recommendations at step 2020. If a user's changes are inconsistent with the user's personal mobility device characteristics and planned usage of the trip, the system will prompt the user for alternative selections and/or propose alternative charging unit bookings. Upon acceptance of the recommendations at step 2020, the reservations may be generated at step 2024.

Upon confirmation of a trip plan, the system will make the necessary charging unit 1614 reservations at step 2024 and interface with the appropriate charging units to perform the necessary booking protocols such that the charging unit 1614 is reserved for a particular user. At all times the power output of charging unit 1614 is turned off and not available to unauthorized users and/or devices until appropriately validated. Alternatively, using the trip planning functionalities 1802 of the application 1616, the user can simply plan a trip by selecting planned trip on the opening screen of his smart phone and the system in conjunction with AIS 1713 will check the availability of charging units 1614 at various destination points and generate a trip plan with trip stop sequences automatically.

Figure 21:
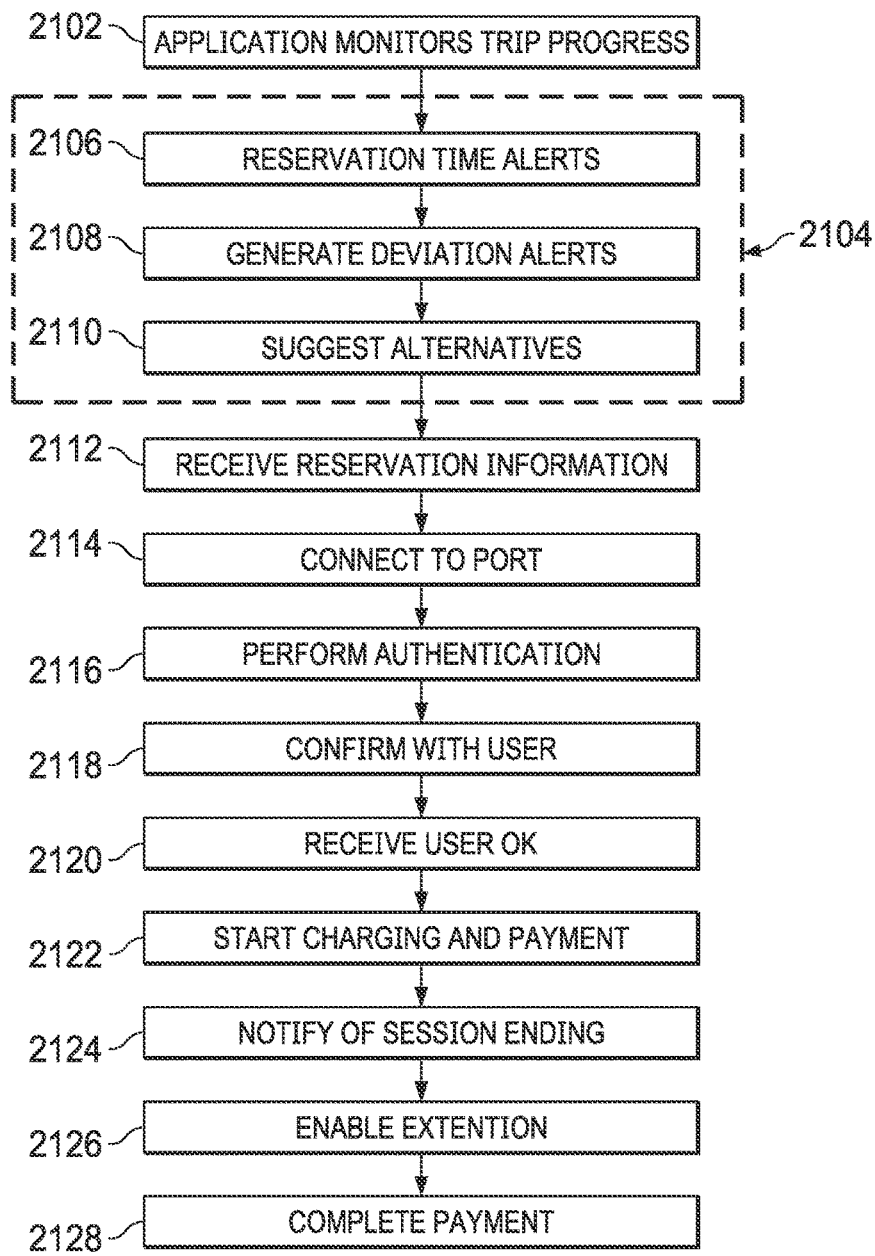
FIG. 21 illustrates an individual user using the medical/mobility device charging management system during a particular trip.

Referring now to FIG. 21, there is illustrated the process of using various reservations for device recharging during an actual trip. The user begins their journey and the mobile application 1616 will monitor the trip progress at step 2102. Based upon the trip progress monitoring, a number of different alerts or suggestions as shown generally at step 2104 may be generated to the user through their mobile application 1616. The user may be prompted along the way with reservation time alerts 2106 as scheduled charging unit 1614 reservation times approach. Alternatively, if the monitoring determines that the user has deviated from their trip plan schedule and appears to endanger their battery consumption plan, the system will generate a deviation alert at 2108 and prompt for a corrective action or propose a change in the trip sequence at step 2110 so as to enable an alternative charging units 1614 booking. However, such changes may result in booking cancellation penalties which are charged directly to the users credit card or bank account on file within the system. The user may also engage the AIS to entirely manage the charging sequences based on tracking the user's journey.

When a user stops at an appointed time at an appointed charging unit location, the user will present their reservation information at step 2112 to the charging unit and is directed to a charging unit 1614 where the user can connect their personal mobility device, personal medical device or other rechargeable electric/electronic devices. Alternatively the charging unit 1614 may also provide indication of its location by optical means such as flashing colored lights which also indicates the charger's state of operation. The charging unit 1614 may also broadcast its location using beacon technologies that the mobile application 1616 may home in to or lock onto to provide direction guidance. Assuming that the vendor is a restaurant, the charging unit 1614 will likely comprise a reserved table. The personal mobility devices or electric wheelchair can simply wheel up to the table and charge while they are dining. Alternatively, if the personal mobility devices and electric scooter cannot be used at a dining table, the vendor will likely have a designated parking area that is charging unit 1614 equipped, and the user is provided with a temporary wheelchair which can be used at the table. All such information concerning the vendor charging environment is available to the user through their mobile application 1616.

The user connects their device to the charging unit at step 2114. As soon as the device is plugged into the charging unit 1614, an authentication sequence will be initiated at step 2116. The progress of the authentication sequence is displayed on the users mobile application 1616 and may comprise verifying the personal mobility device identification (e.g. registered serial number), verifying the make model and power specification of the personal mobility device (which requires a user's affirmative action to ensure that the personal mobility device has not been modified from its original manufacturing state), the user's credit card, bank account or other payment source is validated, and the time of the connection is recorded. Alternatively, if the user had purchased usage credits in advance then such credits may be utilized as payment. The user authorizes commencement of the charging at step 2118 and this confirmation is received by the charging unit 1614 at step 2120. The system provides for different categories of users and does not require that the user have a smart phone and mobile application 1612. Each vendor having a charging unit is equipped or enabled to act as a proxy for authorization whereupon the visiting user may perform the authorization via the vendor's point-of-sale device. Such an option is a necessity in the case of a disabled user that cannot operate a smart phone, or tablet or does not have either one. Alternatively the system may use biometric validation methodologies.

The charging process is initiated and payment made at step 2122. Once the scheduled charging unit session is nearing termination, the user and vendor are alerted at step 2124. The user may be given an opportunity to extend the charging session at step 2126 provided that no other bookings for the charging unit 1614 have been scheduled. In the event that the specific charging unit 1614 has been pre-scheduled by another user, the system may offer the current user a different charging unit that is available on premise. The system or vendor also has the ability to re-assign a different charging unit 1614 to the next scheduled user whereby the current user of a charging unit may extend his charging time or use of the vendor's facilities for perhaps an additional fee. Once the session is terminated, the system will complete the payment protocols at step 2128, and the user's preselected form of payment is charged and credited to the serving vendor's account. The system provides a variety of financial payment operations as commonly practiced in e-commerce such as scheduled billing and payment, recordkeeping and periodic statement reporting, etc. It is up to the system operator and vendor to determine the frequency and method of payment from the system operator to the vendor.

Figure 22:
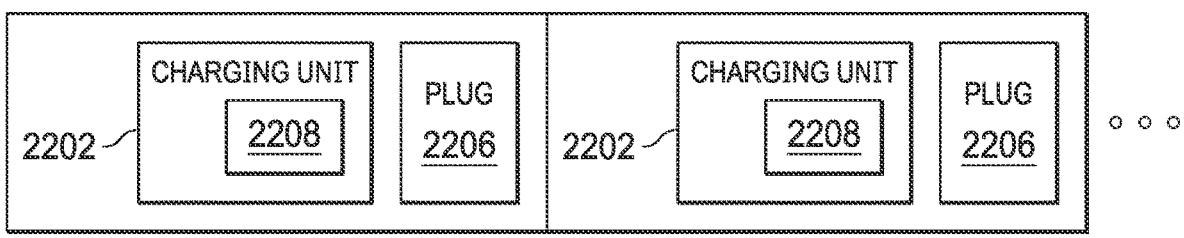
FIG. 22 illustrates a further configuration of the charging units included within a group of one or more lockers.

Referring now to FIG. 22, there is illustrated a further configuration of the charging units, wherein a plurality of charging units 2202 are included within a group of one or more lockers 2204. Each locker 2204 includes at least one charging unit 2202 such as that discussed herein above and a plug 2206 for connecting any type of electric device that needs charging. Users can access the locker by several means, by using a digital or biometric key or by paying an indicated fee. In the case of a digital key the user enters a code received through a mobile application or by paying an indicated fee through the application. Alternatively, the user may gain access by biometric verification of his identity compared with a pre-stored biometric file in the system. Upon validation of the user's identity the user is then able to have access to the charging unit 2202 and plug 2206. The user can then connect their device for charging and lock the device in the locker while it is charging to maintain the device in a secure location while the user perform other activities. The communications interface 2208 associated with the charging unit 2202 can contact the user through the user's mobile application to broadcast a charging state (charging, quarter charge, half charge, three-quarter charge, complete charge, etc.) of the electric device being charged. The lockers 2204 could additionally be used in a kiosk or other convenient grouping of the charging units.

The preceding discussion depicts one example of a charging management and reservation system wherein a personal mobility device, personal medical device or other electric device is charged with a device specific cable that presumably delivers the appropriate DC voltage and amperage to the device while the charging unit 2202 performs the charge monitoring and management. Different devices may have different battery charging protocols, different connectors and characteristics and may either have an onboard charger which can be directly connected to the 120 V AC outlet or require an offboard (not part of the device) charger that provides the appropriate DC charge voltage and amperage and connectors. All these characteristics of specific devices are matched to the specific vendor's equipment repertoire.

The architecture of the management and reservation system 1610 is designed to be an "open" system which enables the incorporation of third-party apps and system components such as third-party cloud platforms, group meeting and group gifting apps. Additionally, the system functionality is an open system that can provide the same reservation and charging functionality for other rechargeable devices such as Ebikes, two wheeled balance scooters or Segway devices, smart phones and tablets and portable respiratory devices dependent on the particular vendor. A vendor could simply be an individual that owns a charger for a specific rechargeable device that may be obsolete or hard to come by and in such situations the individual vendor may find an opportunity to rent out their charger rather than recovering a one-time sale. The user could also be traveling and have forgotten to carry their charging equipment for their device in which case the ability to rent such a charger via the system would be a lifesaver.

The system also incorporates the capability to register vendors on the spot via the mobile application 1616 as in the case when a user finds a willing establishment that is not yet part of the system but which is willing to allow the user to utilize the establishment's 120 V AC or alternative power outlet. In providing this vendor registration capability via the mobile application 1616, the system is able to propagate utility organically via its membership database.

Figure 23:
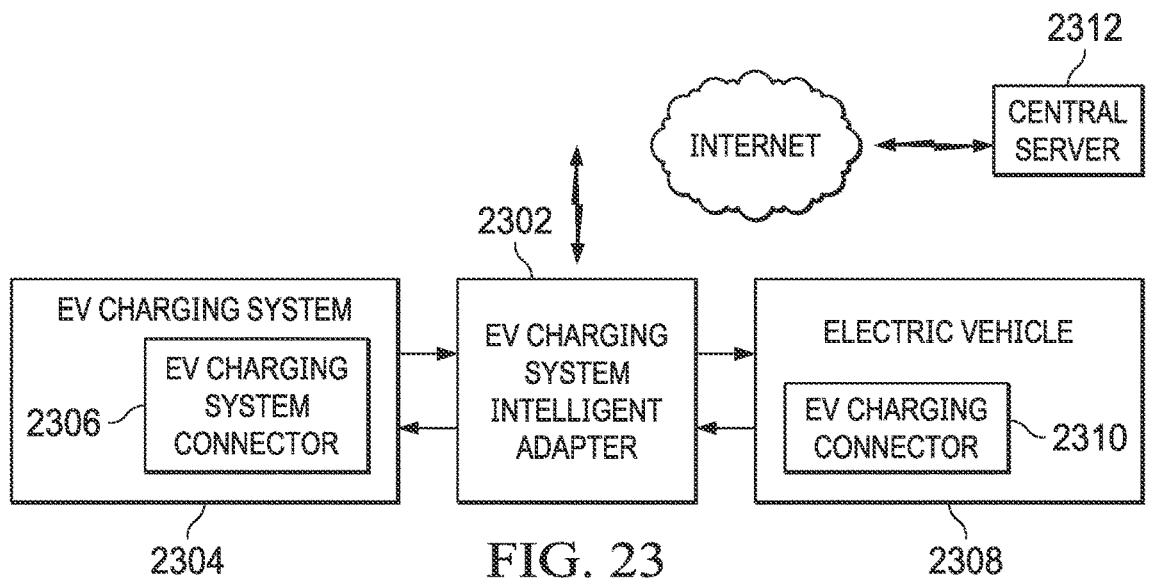
FIG. 23 illustrates a block diagram of an intelligent charging adapter for use with a dumb charging system.

Referring now to FIG. 23, there is illustrated a further embodiment wherein an electric vehicle charging system intelligent adapter 2302 may be used for converting a dumb electric vehicle charging system 2304 that provides no network interconnectivity into an intelligent charging system with remote communications connectivity and control. The electric vehicle charging system 2304 such as that described hereinabove includes an electric vehicle charging system connector 2306 that is used for interconnecting with an electric vehicle 2308. In its normal configuration, the electric vehicle charging system connector 2306 connects directly with the electric vehicle charging connector 2310 to initiate charging of the vehicle 2308. As electrical vehicles become more popular, the access to public charging station remains the number one barrier to widespread adoption of electric vehicle technologies. The high cost of installing and equipping electric vehicle charging stations (EV stations) with one or more EV chargers hinders the construction and deployment of EV charging stations. In addition, most EV charging stations are unmanned and thus the availability of the stations' EV charging chargers is unknown until electric vehicle drivers arrive at a particular location to use the chargers. Thus when they arrive, the driver may find the equipment is already in use or currently inoperative.

This limitation may be overcome as shown in FIG. 23 by use of an electric vehicle charging system intelligent adapter 2302. The adapter 2302 provides for remote communications connectivity and control to provide better control and information with respect to the EV charging system 2304.

The EV charging system intelligent adapter 2302 converts the standalone EV charger 2304 at any unmanned EV station into an intelligent charger whereby the availability of such chargers may be monitored and reserved remotely and controlled for dispensing electricity using for example the systems described hereinabove. A single EV charging system intelligent adapter 2302 is required for each charger 2304 at the EV charging station. The adapter 2302 is designed to interface directly with the EV charging system connector 2306 such that the adapter 2302 merely plugs into the connector 2306 of the charging system 2304. The EV charging system intelligent adapter 2302 then plugs into the electric vehicle charging connector 2310 in the same manner that the EV charging system connector 2306 would. The adapter 2302 then provides remote communications connectivity and control as will be more fully described herein below. This makes the conversion process simple and inexpensive.

There are over 50,000 unmanned publicly accessible EV chargers within the US that are neither remotely controlled nor available for remote reservation. In addition there are hundreds of thousands more EV chargers that are installed in private homes by electric vehicle owners. By equipping such standalone EV chargers 2304 with an EV charging system intelligent adapter 2302, electric vehicle drivers may conveniently search for adapter equipped chargers that are available and even reserve the chargers without being inconvenienced by traveling to an unmanned EV station to only find out that the chargers are not available for use.

The EV charging system intelligent adapter 2302 encompasses various technologies such as the Internet, cloud computing, wireless communications, remote control techniques, in-line, near-field and transponder communications, power transmission protocols, delivery and measurement, database techniques and technologies, smart electricity grid techniques, alternate power conveyance grids, direct and wireless power conveyance/delivery/moveence, location determination technologies such as GPS, and Internet Of Things ("TOT") protocols and methods to enable and empower EV chargers with intelligence for remote control and use.

The EV charging system intelligent adapter 2302 is an electrical and mechanical apparatus that is attachable to the charging connector 2306 of an EV charger 2304 that complies with the International Electrotechnical Commission (IEC) standards and other relevant standards governing EV conductive charging systems with general characteristics including charging modes and connection configurations, and requirements for specific implementations (including safety requirements) of both electrical vehicle 2308 and electric vehicle supply equipment (EVSE) in a charging system, such as the control of power supplied to the electrical vehicle 2308 and the signaling between the electrical vehicle 2308 and the EV charger 2304. Such standards may also cover devices such as plugs, socket-outlets, vehicle couplers and vehicle inlets. In one embodiment the EV charging system connector 2306 may comprise a SAE J1772 Level 1/2 connector as used in North America. However, the functionality and principles of the system extend to all other standard conforming connectors such as the VDE-AR-E-2623-2-2 which is used in Europe, the JEVS G105-1993 (commonly known as CHAdeMO) which is used in Japan and any other configuration for a charging connector.

Further, the use of the adapter 2302 is not constrained to Level 1, 2 or 3 chargers with their different voltages and current limits. Essentially, just as the J1772 connector is equipped with five pins of which two are the AC wires, one is the ground, and two are signal pins for proximity detection and for the control pilot function; other connector types also have at least one pin that is used as a control communications link and one or more pins as power pins for DC or AC power.

Figure 24:
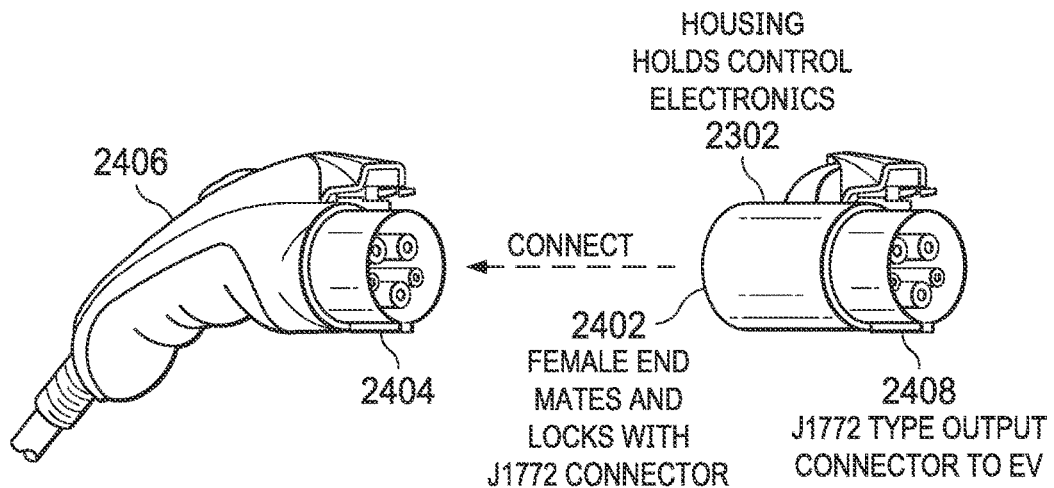
FIG. 24 illustrates a charging adapter that mates with a charge connector of a charging system.
Figure 25:
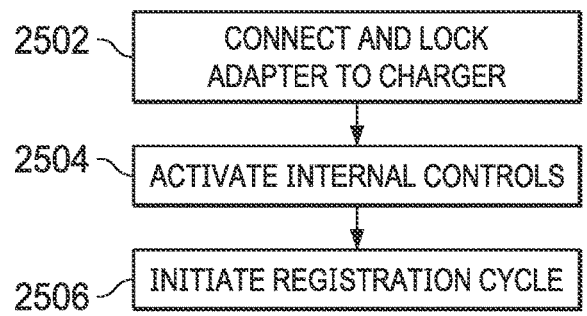
FIG. 25 illustrates a flow diagram of the process occurring when a charging adapter is connected with the charging system.

Referring to FIG. 24, the EV charging system intelligent adapter 2302 contains control electronics that manage the functions of the adapter. The adapters 2302 corresponding female inputs 2402 mate and lock with the male connector pins 2404 in the J1772 connector 2406 coming from the EV charger 2304. The adapter 2302 provides a new J11772 type connector 2408 to act as a connector with an electric vehicle connector 2310. Referring now also to FIG. 25 there is illustrated the process for connection of an adapter 2302 to an EV charging system connector 2306. Upon mating and locking of the adapter 2302 with the charger's J1772 connector 2406 at step 2502, the adapter's internal controls are activated at step 2504 and initiate a registration cycle at step 2506 whereby the adapter 2302 is wirelessly connected to a central server 2312 under management of the charger service administrator. The registration process essentially tells the central server 2312 that the EV charger 2304 to which the adapter 2302 is connected is now registered in the system and available for rent.

Figure 26:
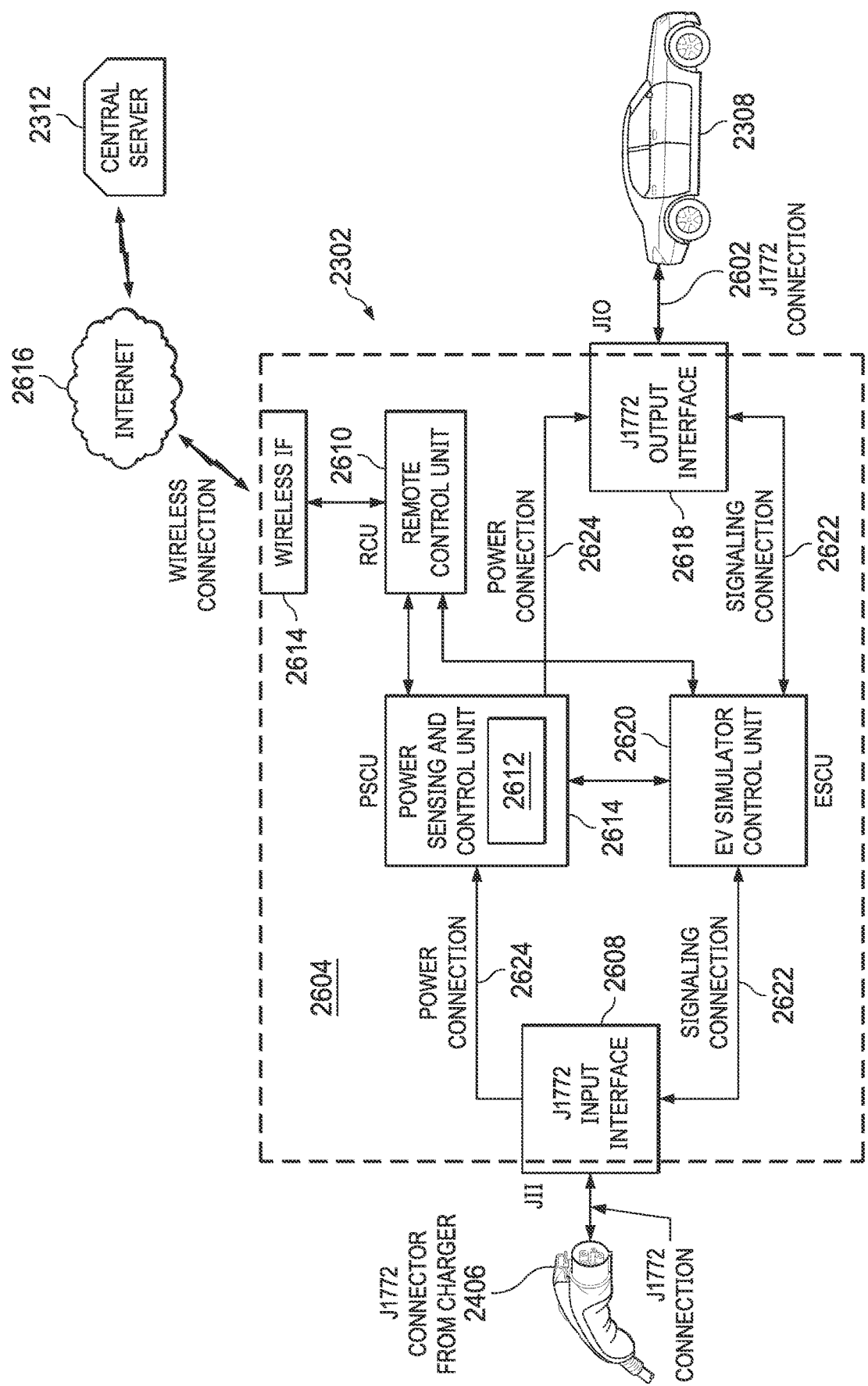
FIG. 26 illustrates a functional block diagram of the intelligent charging adapter.

Referring to FIG. 26 there is illustrated a functional block diagram of the adapter 2302 for interconnecting a J1772 connector 2406 with an electric vehicle 2308 via another J1772 connector 2602. The adapter components are located within an adapter housing 2604. The J1772 connector 2406 on the input side of the adapter 2302 is connected to a functioning EV charger 2304, which in turn is connected to an electrical power supply. The input interface 2608 provides a means for connecting the adapter 2302 with the EV charger connector 2406 and includes female inputs for interconnecting with the male input pins of the charger connector 2406. Once the adapter 2302 mates with the EV charger 2304 through its J1772 connector 2406 to the adapter's J1772 input interface 2608, the remote control unit (RCU) 2610 detects the connection to the charger and activates the adapter using power from an internal removable, rechargeable battery 2612 within the power sensing control unit (PSCU) 2614. The RCU 2610 then commences communications with the central server 2312 using a wireless interface 2614. The wireless interface 2614 provides for a connection to the central server 2312 using a cellular data network, Wi-Fi network or any other type of wireless communications protocol. The RCU 2610 controls operation of the adapter 2302, manages control of the adapter responsive to commands from the central server 2312 and controls charging signals passing through the adapter 2302.

The central server 2312 manages all the adapters 2302 in the field and also the mobile apps within user's mobile devices for reserving an adapter-equipped charger (an "i-Charger"). The RCU 2610 contains a communications module that set ups a communications link with a local Wi-Fi router or other wireless communications network to access the Internet cloud 2616 and thereon to connect with the central server 2312 using the wireless interface 2614. The connection with the cloud 2616 may be provided by several means including inline powerline communications or wireless router to a modem connected to an Internet provider, or by satellite data connection, or through a cellular data link. Thus, even a remote EV charger 2304 can be communicated with by the central server 2312.

Figure 27:
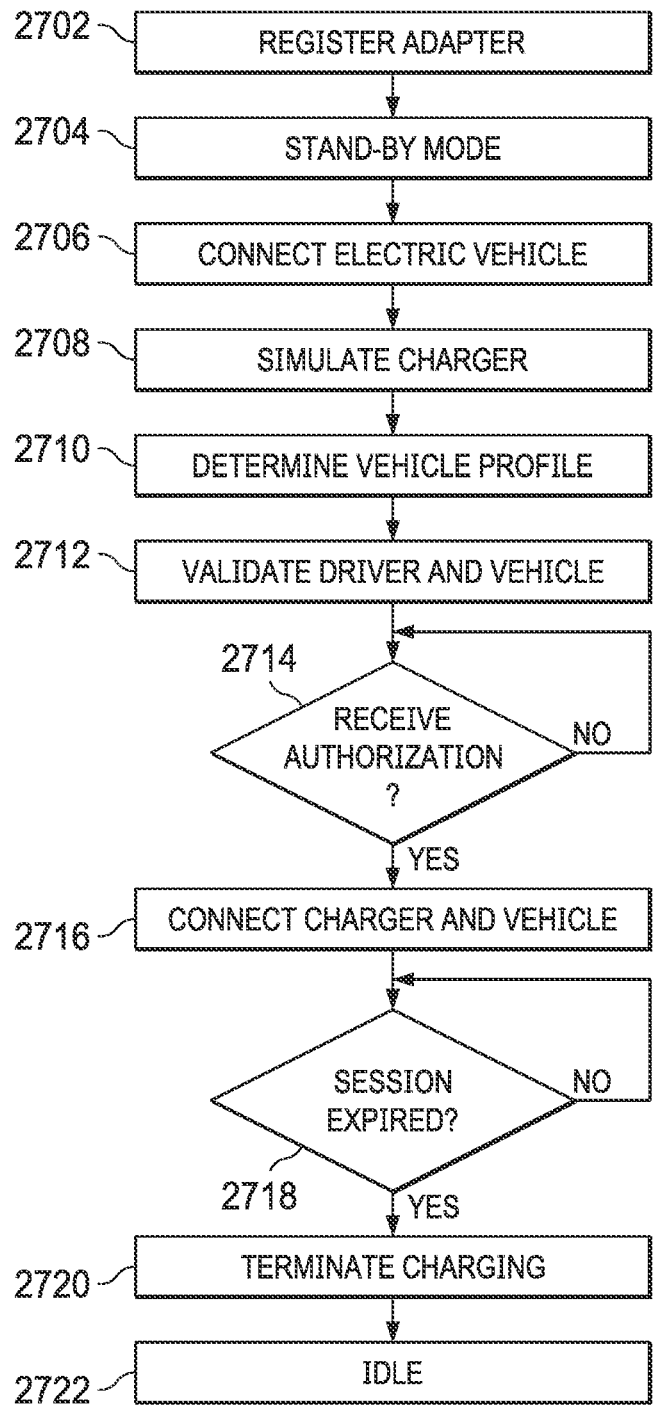
FIG. 27 illustrates a flow diagram of the manner in which the intelligent charging adapter controls a charging process between a charger and an electric vehicle.

Referring now also to FIG. 27, there is illustrated a flow chart more fully describing the operation of the adapter 2302 when connected to a charger 2304. Once communications are established with central server 2312, the RCU 2610 registers the presence and availability of the adapter 2302 in the registry of adapters maintained at the central server 2312 at step 2702. The RCU 2610 next switches the adapter 2302 into standby mode at step 2704 to await the arrival of an electrical vehicle 2308 to connect with the J1772 output interface (JIO) 2618. In this idle state, the adapter 2302 draws its electricity from the internal rechargeable battery 2612 in the PSCU 2614.

When an electric vehicle 2308 arrives at an i-Charger station (an adapter 2302 equipped charger station) for a reservation, a driver of the vehicle will launch a mobile app associated with the charger reservation service such as that described above and obtain validation for a charging session which may have been reserved in advance. The driver next connects the electric vehicle 2308 at step 2706 to the adapter 2302 via the JIO interface 2618, which triggers the RCU 2610 to simulate appearing as a charger to the electric vehicle at step 2708 in order to determine at step 2710 the electric vehicle profile such as make of vehicle and the battery properties. The RCU 2610 then communicates with central server 2312 to validate the driver and electric vehicle at step 2712. Upon receiving authorization for a valid charge at step 2714, the RCU 2610 instructs the EV simulator control unit (ESCU) 2620 to connect the signal line 2622 between the charger 2304 and the electric vehicle 2308 at step 2716. The EV simulator control unit 2620 controls the connection and communications between the charger 2304 and the electric vehicle 2308. While the adapter 2302 is in the idle state this signal line 2622 is open so that the charger 2304 cannot communicate prematurely with the electric vehicle 2308 and enable the adapter 2302 to complete its pre-charge session protocols with the central server 2312 such as to validate and record the charging session, etc. This signal line 2622 is the only switchable line within the adapter 2302 as it is the means of communicating with the EV charger 2304 for controlling the activation or termination of power from the EV charger 2304. However, as technologies and EV charging evolve there may be more than one switchable communications line/link.

Once the session is authorized the ESCU 2620 acts as a transponder and enables communications between the EV charger 2304 and the electric vehicle 2308 via the signal line 2622. The EV charger 2304 performs its normal charging sequence and detects the type of electric vehicle 2308 and battery to charge and performs a normal charging routine to charge the authorized connected electric vehicle 2308. During electric vehicle 2308 charging the PSCU 2614 will tap power from the charge lines 2624 by inductance, capacitance or other means to recharge the rechargeable battery 2612 of the adapter 2302 which powers the adapter electronics. The PSCU 2614 does not switch the power lines to the EV itself due to the high voltages and current that is typical and which would require bulky relays. While this embodiment describes inductance charging and use of a rechargeable battery 2612 to power the adapter electronics, other means of powering the adapter electronics may be used. The PSCU 2614 manages and distributes the appropriate control power to all the electronics elements in the adapter 2302. Also, while this illustration cites the use of the signal line 2622 for communications between the EV charger 2304 and the electric vehicle 2308, other charging devices and standards may evolve and embody other means of communications between the electric vehicle 2308 and the charger 2304 but the underlying principle of the adapter 2302 acting as an intermediary control mechanism still applies.

During the electric vehicle 2308 charging session the RCU 2610 monitors the connection at step 2718 via the signal line 2622 until its program or the central server 2312 determines that the reservation period has expired and that the charging is to terminate at step 2720. At this point the ESCU 2620 is instructed to break the signal line connection between the electric vehicle 2308 and the EV charger 2304 and take control of the charger's signal line instead. Herein, the ESCU 2620 simulates as the electric vehicle 2308 and instructs the charger 2304 to cut off the charging power to the electric vehicle and the adapter 2302 reverts to its idle position at step 2722 to await the next charging transaction. Besides controlling the connection or disconnection of the signal line 2622 between the EV charger 2304 and the electric vehicle 2308, the ESCU 2620 also performs the EV charging termination sequence according to the charger it is connected to.

Thus, the adapter 2302 serves to turn an ordinary "dumb" standalone EV charger 2304 into an intelligent charger that can broadcast its availability status and also control the charging session of an electric vehicle 2308. The illustration provided above for a J1772 provisioned EV charger 2304 is an illustration of the control functions of the adapter 2302 and its application. The sequence of operation of the functional elements of the adapter 2302 may vary depending on the production design of the adapter 2302 and its application, the various standards in force, and the types of chargers used, but the underlying principal functions of the adapter 2302 as an intermediary control mechanism still apply. The adapter 2302 may be produced to be compatible with different physical packaging. Additionally, the electric vehicle 2308 may comprise an automobile or other type of electric personal mobility device. The system would also be useful in reserving charging stations for charging any other type of electrical device.

It will be appreciated by those skilled in the art having the benefit of this disclosure that these mobile electric vehicle charging stations provide a tremendous utility to the EV driver while reducing the need for, and cost of installing fixed EV charging stations that can never keep up with the growth of EV adoption. Mobile EV charging stations also remove or greatly reduce range anxiety or the fear of running out of battery charge far away from fixed EV charging stations. By enabling EV charging stations to be mobile, drivers need not delineate from taking direct routes to their intended destinations merely to be close to fixed EV charging stations that are out of their intended trip paths. It should be understood that the drawings and detailed description herein are to be regarded in an illustrative rather than a restrictive manner, and are not intended to be limiting to the particular forms and examples disclosed. On the contrary, included are any further modifications, changes, rearrangements, substitutions, alternatives, design choices, and embodiments apparent to those of ordinary skill in the art, without departing from the spirit and scope hereof, as defined by the following claims. Thus, it is intended that the following claims be interpreted to embrace all such further modifications, changes, rearrangements, substitutions, alternatives, design choices, and embodiments.

What is claimed is:

1. A mobile charging platform for charging an electric vehicle, comprising:
    an electric vehicle charger for charging the electric vehicle;
    a connector for connecting the electric vehicle to the electric vehicle charger;
    at least one a power source for providing power mobility to the mobile charging platform and power to the electric vehicle charger;
    a positional tracking device for determining a first position of the mobile charging platform;
    a mobile charging platform controller for transmitting and receiving control data for dynamically scheduling and coordinating a meeting location between the mobile charging platform that is currently traveling and the electric vehicle that is currently traveling responsive to the first position of the mobile charging platform and a second position of the electric vehicle; and
    a transportation platform for transporting the electric vehicle charger, the connector, the power source, the positional tracking device and the mobile charging platform controller.

2. The mobile charging platform of claim 1, further comprising a vehicle securing apparatus for securing the electric vehicle to a transport position on the mobile charging platform for charging of the electric vehicle while the mobile charging platform is in motion.

3. The mobile charging platform of claim 1, wherein the power source of the electric vehicle charger comprises an electric power generator.

4. The mobile charging platform of claim 3, wherein the electric power generator is powered by at least one of a bank of batteries, a gasoline-powered motor, a wind-power turbine and a hydrogen-powered engine.

5. The mobile charging platform of claim 1, wherein the at least one power source comprises at least one battery for a combined load or for each load.

6. The mobile charging platform of claim 5, wherein in a first configuration the at least one battery is recharged while positioned within the mobile charging platform and in a second configuration are removeable for recharging remotely from the mobile charging platform.

7. The mobile charging platform of claim 5, wherein the at least one battery in a discharged state is exchangeable with a fully charged at least one battery.

8. The mobile charging platform of claim 1, wherein the mobile charging platform controller comprises an artificial intelligence controller for determining the first position of the mobile charging platform that is traveling responsive to data from the positional tracking device and optimizing scheduling of the meeting location between the mobile charging platform that is currently traveling and the electric vehicle that is currently traveling.

9. The mobile charging platform of claim 1 further comprising an adapter for providing smart charging for the electric vehicle charger; the adapter comprising:
    a first input interface for interconnecting the adapter with the connector of the mobile charging platform;
    a second input interface for interconnecting the adapter with a second charging connector of the electric vehicle;
    a wireless communications interface for providing wireless connectivity to the adapter, the wireless connectivity initiated responsive to connection of the first input interface with the connector of the mobile charging platform; and
    control circuitry interconnecting the first input interface with the second input interface via a signaling connection for providing communications between the first input interface and the second input interface, the control circuitry further providing a power connection for selectively providing a charging signal from the first input interface to the second input interface responsive to commands received over the wireless communications interface and the signaling connection.

10. The mobile charging platform of claim 1, wherein the mobile charging platform further comprises storage locations for concessions, further wherein the mobile charging platform controller transmits and receives second control data for ordering concessions form the mobile charging platform at the meeting location between the mobile charging platform and the electric vehicle.

11. The mobile charging platform of claim 1 further comprises an autonomous vehicle control module for controlling driving of the mobile charging platform, wherein the autonomous vehicle control module navigates the mobile charging platform to the meeting location determined by the mobile charging platform controller.

12. The mobile charging platform of claim 1, wherein the electric vehicle charger, the at least one power source to the electric vehicle charger and the connector for connecting the electric vehicle to the electric vehicle charger can be transferred from one transportation platform to another or dropped off at a location to provide charging service.

13. A mobile charging platform for charging an electric vehicle, comprising:
an electric vehicle charger for charging the electric vehicle, wherein the electric vehicle charger is powered by an energy source providing power for operation of the mobile charging platform;
a connector for connecting the electric vehicle to the electric vehicle charger;
a positional tracking device for determining a first position of the mobile charging platform; and
a mobile charging platform controller for transmitting and receiving control data for dynamically scheduling and coordinating a meeting location between the mobile charging platform that is currently traveling and the electric vehicle that is currently traveling responsive to the first position of the mobile charging platform and a second position of the electric vehicle.

14. The mobile charging platform of claim 13, wherein the mobile charging platform controller comprises an artificial intelligence controller for determining the first position of the mobile charging platform that is traveling responsive to data from the positional tracking device and optimizing scheduling of the meeting location between the mobile charging platform that is traveling and the electric vehicle that is traveling.

15. The mobile charging platform of claim 13 further comprising an adapter for providing smart charging for the electric vehicle charger; the adapter comprising:
a first input interface for interconnecting the adapter with the connector of the mobile charging platform;
a second input interface for interconnecting the adapter with a second charging connector of the electric vehicle;
a wireless communications interface for providing wireless connectivity to the adapter, the wireless connectivity initiated responsive to connection of the first input interface with the connector of the mobile charging platform; and
control circuitry interconnecting the first input interface with the second input interface via a signaling connection for providing communications between the first input interface and the second input interface, the control circuitry further providing a power connection for selectively providing a charging signal from the first input interface to the second input interface responsive to commands received over the wireless communications interface and the signaling connection.

16. The mobile charging platform of claim 13 further comprises an autonomous vehicle control module for controlling driving of the mobile charging platform, wherein the autonomous vehicle control module navigates the mobile charging platform to the meeting location determined by the mobile charging platform controller.

17. A mobile charging platform for charging an electric vehicle, comprising:
an electric vehicle charger for charging the electric vehicle;
a connector for connecting the electric vehicle to the electric vehicle charger;
a power source for providing power to the electric vehicle charger,
a second power source for providing power to the mobile charging platform; and
a mobile charging platform controller for transmitting and receiving control data for dynamically scheduling and coordinating a meeting location between the mobile charging platform that is currently traveling and the electric vehicle that is currently traveling responsive to a first position of the mobile charging platform and a second position of the electric vehicle, wherein the mobile charging platform controller confirms the electric vehicle charger is compatible with the electric vehicle.

18. The mobile charging platform of claim 17 wherein the mobile charging platform communicates with a remotely located server that generates the control data to schedule the meeting location between the mobile charging platform and the electric vehicle responsive to a first position data of the mobile charging platform application and the second position received of the electric vehicle.

19. The mobile charging platform of claim 17, wherein the mobile charging platform controller comprises an artificial intelligence controller for determining the first position of the mobile charging platform that is traveling responsive to data from the positional tracking device and optimizing scheduling of the meeting location between the mobile charging platform that is traveling and the electric vehicle that is traveling.

20. The mobile charging platform of claim 17 further comprises an autonomous vehicle control module for controlling driving of the mobile charging platform, wherein the autonomous vehicle control module navigates the mobile charging platform to the meeting location determined by the mobile charging platform controller.

\* \* \* \* \*